US012143785B2

(12) United States Patent
MacLean et al.

(10) Patent No.: US 12,143,785 B2

(45) Date of Patent: Nov. 12, 2024

(54) SYSTEMS AND METHODS OF DISTRIBUTING AND PLAYING BACK LOW-FREQUENCY AUDIO CONTENT

(71) Applicant: Sonos, Inc., Santa Barbara, CA (US)

(72) Inventors: Paul MacLean, Quincy, MA (US); Chris Davies, Santa Barbara, CA (US); Roberto Maria Dizon, Cambridge, MA (US)

(73) Assignee: Sonos, Inc., Santa Barbara, CA (US)

(*) Notice: Subject to any disclaimer, the term of this patent is extended or adjusted under 35 U.S.C. 154(b) by 374 days.

(21) Appl. No.: 17/649,141

(22) Filed: Jan. 27, 2022

(65) Prior Publication Data

US 2022/0240012 A1 Jul. 28, 2022

Related U.S. Application Data

(60) Provisional application No. 63/199,839, filed on Jan. 28, 2021.

(51) Int. Cl.
*H04R 3/12* (2006.01)
*H04R 5/02* (2006.01)
(Continued)

(52) U.S. Cl.
CPC ................ *H04R 3/12* (2013.01); *H04R 5/02* (2013.01); *H04R 5/04* (2013.01); *H04S 3/008* (2013.01);
(Continued)

(58) Field of Classification Search
None
See application file for complete search history.

(56) References Cited

U.S. PATENT DOCUMENTS 5,440,644 A 8/1995 Farinelli et al.
5,761,320 A 6/1998 Farinelli et al.
(Continued)

FOREIGN PATENT DOCUMENTS

| | | | |
|---|---|---|---|
| EP | 1389853 | A1 | 2/2004 |
| WO | 200153994 | | 7/2001 |
| WO | 2003093950 | A2 | 11/2003 |

OTHER PUBLICATIONS

AudioTron Quick Start Guide, Version 1.0, Mar. 2001, 24 pages.
(Continued)

*Primary Examiner* — Duc Nguyen
*Assistant Examiner* — Assad Mohammed
(74) *Attorney, Agent, or Firm* — Fortem IP LLP

(57) ABSTRACT

Multichannel audio playback devices and associated systems and methods are disclosed herein. In some examples, a first playback device is configured to receive a source stream of audio content comprising left, right and center input channels. In a first mode, the first playback device is configured to play back audio via a plurality of transducers based on the left, right, and center input channels. In a second mode, in which the first playback device is bonded to second and third playback devices, the first playback device is configured to (i) play back audio via the plurality of transducers based on at least the center input channel, (ii) cause audio to be played via the second playback device based on at least the right input channel, and (iii) cause audio to be played via the third playback device based on at least the left input channel.

17 Claims, 10 Drawing Sheets

(51) Int. Cl.
*H04R 5/04* (2006.01)
*H04S 3/00* (2006.01)

(52) U.S. Cl.
CPC ...... *H04R 2420/07* (2013.01); *H04S 2400/01* (2013.01)

(56) References Cited

U.S. PATENT DOCUMENTS 5,923,902 A 7/1999 Inagaki
6,032,202 A 2/2000 Lea et al.
6,256,554 B1 7/2001 DiLorenzo
6,404,811 B1 6/2002 Cvetko et al.
6,469,633 B1 10/2002 Wachter
6,522,886 B1 2/2003 Youngs et al.
6,611,537 B1 8/2003 Edens et al.
6,631,410 B1 10/2003 Kowalski et al.
6,757,517 B2 6/2004 Chang
6,778,869 B2 8/2004 Champion
7,130,608 B2 10/2006 Hollstrom et al.
7,130,616 B2 10/2006 Janik
7,143,939 B2 12/2006 Henzerling
7,236,773 B2 6/2007 Thomas
7,295,548 B2 11/2007 Blank et al.
7,391,791 B2 6/2008 Balassanian et al.
7,483,538 B2 1/2009 McCarty et al.
7,571,014 B1 8/2009 Lambourne et al.
7,630,501 B2 12/2009 Blank et al.
7,643,894 B2 1/2010 Braithwaite et al.
7,657,910 B1 2/2010 McAulay et al.
7,853,341 B2 12/2010 McCarty et al.
7,987,294 B2 7/2011 Bryce et al.
8,014,423 B2 9/2011 Thaler et al.
8,045,952 B2 10/2011 Qureshey et al.
8,103,009 B2 1/2012 McCarty et al.
8,234,395 B2 7/2012 Millington
8,483,853 B1 7/2013 Lambourne
8,804,971 B1 * 8/2014 Williams .............. G10L 19/008 381/23
8,942,252 B2 1/2015 Balassanian et al.
2001/0042107 A1 11/2001 Palm
2002/0022453 A1 2/2002 Balog et al.
2002/0026442 A1 2/2002 Lipscomb et al.
2002/0124097 A1 9/2002 Isely et al.
2003/0157951 A1 8/2003 Hasty, Jr.
2004/0024478 A1 2/2004 Hans et al.
2007/0142944 A1 6/2007 Goldberg et al.
2010/0278346 A1 * 11/2010 Hogue .................... H04S 7/308 381/17
2016/0196106 A1 * 7/2016 Hammer .................. H04R 3/12 381/79

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

SYSTEMS AND METHODS OF DISTRIBUTING AND PLAYING BACK LOW-FREQUENCY AUDIO CONTENT

CROSS-REFERENCE TO RELATED APPLICATION

This application claims the benefit of priority to U.S. Patent Application No. 63/199,839, filed Jan. 28, 2021, which incorporated herein by reference in its entirety.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, examples, examples, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

Figure 1A:
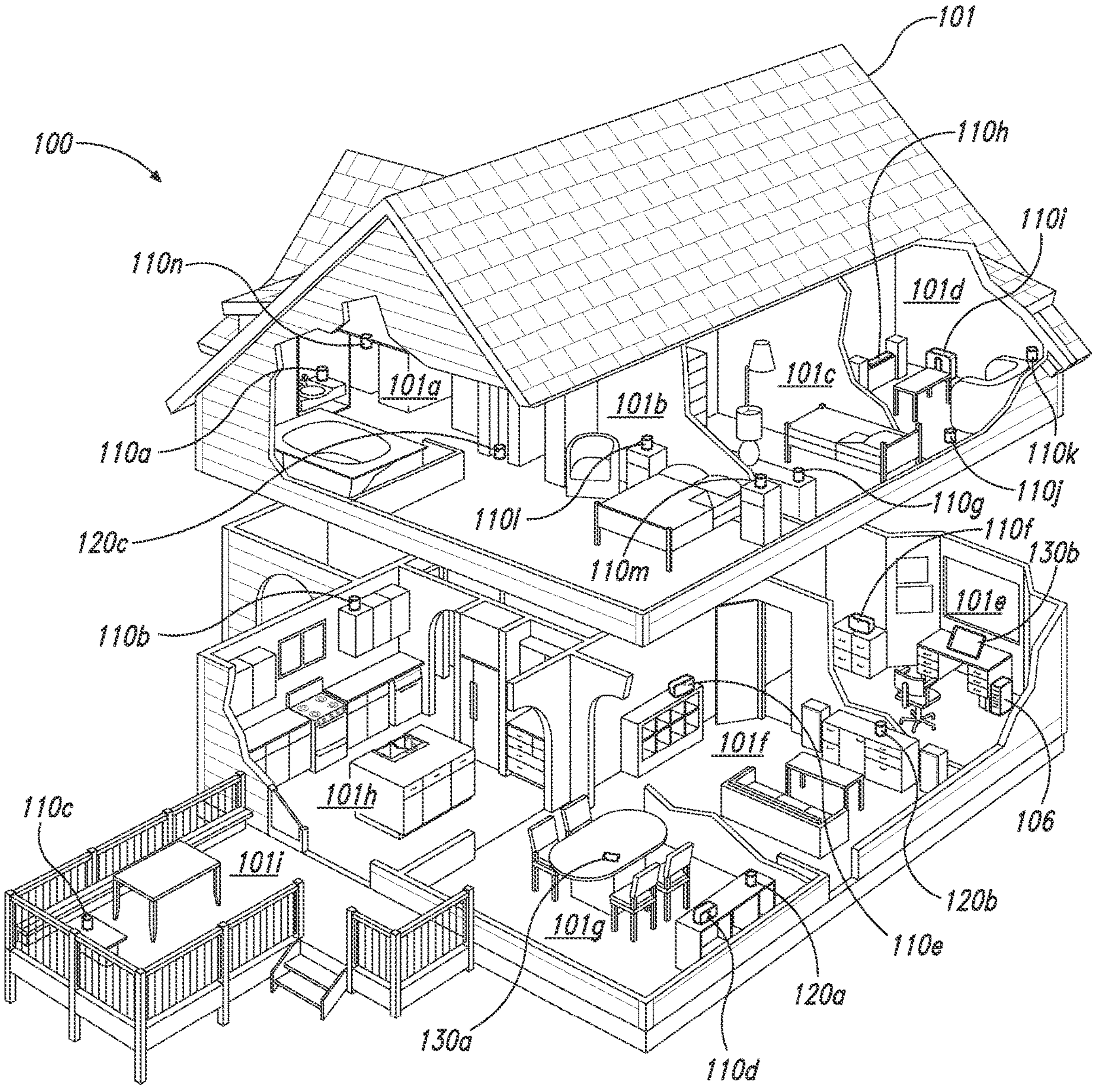
FIG. 1A is a partial cutaway view of an environment having a media playback system configured in accordance with examples of the disclosed technology.

The drawings are for the purpose of illustrating examples, but those of ordinary skill in the art will understand that the technology disclosed herein is not limited to the arrangements and/or instrumentality shown in the drawings.

DETAILED DESCRIPTION

I. Overview

Home theatre audio arrangements often include a group of discrete audio playback devices arranged in a "zone" and configured to play back audio in synchrony with one another, with different devices handling different playback responsibilities. As one example, a soundbar may handle playback of left, right, and center channels, a subwoofer may handle playback a low-frequency effects (LFE) channel, and two discrete satellite playback devices may handle playback of left surround and right surround channels, respectively. In operation, one of the playback devices may be responsible for receiving a stream of multichannel audio content (e.g., 5.1 surround-sound audio) to be played back via the zone. This device can process the audio, play back at least a portion of the audio, and also distribute portions of the audio to appropriate devices within the zone for playback.

Some distribution of audio content can be based on the input channels. For example, a left-surround channel can be routed to a discrete left-surround playback device, a right-surround channel can be routed to a discrete right-surround playback device, and a low-frequency effects (LFE) channel can be routed to a subwoofer or other suitable playback device. Additionally, audio can be processed and routed to improve playback performance. For example, in a home-theatre zone that includes a subwoofer, a crossover can be used to route all low-frequency content below a frequency threshold (e.g., less than 80 Hz, less than 120 Hz, etc.) to the subwoofer, regardless of the input channel from which the low-frequency content originated.

In conventional home theatre playback, processing and distribution of playback responsibilities may be independent of the playback capabilities of the various devices within the zone. However, in some instances, a home theatre zone may include discrete satellite devices (e.g., left and right surrounds) with substantial bass playback capabilities, for example substantially equivalent to or even exceeding the bass playback capabilities of the central playback device (e.g., a soundbar). In these and other cases, it can be useful to distribute playback responsibilities based at least in part on the playback capabilities of the devices, and not only on the particular audio input channels. For example, it can be useful to route at least some of the low-frequency audio content to highly bass-capable satellite playback devices to take advantage of their bass output capabilities. Moreover, because low-frequency content tends to be more omnidirectional during playback, low-frequency content can be played back by satellite devices at various locations within the environment without diminishing the user's listening experience. As another example, in a home theatre arrangement that includes a soundbar and discrete surrounds with low bass-output capabilities, a crossover can route all low-frequency content across all channels to transducers within the soundbar, passing only high-frequency content to the surrounds for playback.

In some examples, processing and distribution of low-frequency content can be dynamically adjusted based on the characteristics of some or all of the playback devices in a home theatre zone. For example, if the playback devices configured to serve as left and right surrounds have lesser bass capabilities, then these devices can automatically operate in a first mode in which low-frequency content is not routed to the left and right surrounds, but instead is played back by other devices within the zone. If, instead, the playback devices configured to serve as left and right surrounds have greater bass capabilities, then the devices can automatically operate in a second mode in which at least a portion of the low-frequency content is routed to the left and right surrounds for playback.

Accordingly, some examples of the present technology provide a playback system that can operate in a plurality of different modes. The first playback device (e.g., a soundbar) can include a plurality of transducers and a network interface configured to facilitate communication with a plurality of discrete satellite playback devices (e.g., second and third playback devices operating as left and right surrounds, respectively). The first playback device can receive a multichannel source stream of audio content that includes one or more first channels (e.g., left, right, and center channels), a second channel (e.g., a left surround channel), and a third channel (e.g., a right surround channel). Based on one or more characteristics of the second and third playback devices, the first playback device can operate in a first mode or in a second mode. While operating in the first mode, the first playback device (i) plays back audio via the plurality of transducers based on at least the first channel(s), (ii) causes, via the network interface, audio to be played back via the second playback device based on the second channel, and (iii) causes audio to be played back via the third playback device based on the third channel. This first operating mode may be appropriate, for example, when the second and third playback devices are relatively less capable of playing back bass frequencies.

While operating in the second mode, the first playback device can (i) play back audio via the plurality of transducers based on at least a high-frequency portion of the first channel(s), (ii) causes audio to be played back via the second playback device that is based on both the second channel and at least a low-frequency portion of the first channel(s), and (iii) causes audio to be played back via the third playback device that is based on both the third channel and at least a low-frequency portion of the first channel(s). This second operating mode may be appropriate, for example, when the second and third playback devices have relatively high bass capabilities, and accordingly are suitable for handling at least some of the low-frequency playback responsibilities.

As described in more detail below, in some examples the first playback device may automatically assume the first or the second operating mode after determining or detecting one or more parameters associated with the satellite playback devices. Such examples can be indicative of bass-output capabilities or other aspects of the device(s), and may include, for example, device model, type, dimensions, etc. In some examples, the first playback device may assume the first or second mode depending on the current playback conditions. For example, the first playback device may operate in the first mode until a playback volume threshold is exceeded, at which point the first playback device may transition to the second mode so as to distribute at least a portion of the low-frequency content to bass-capable satellite devices. In addition or alternatively to transitioning based on playback volume, the transition can be based on a bass output level, transducer excursion levels, acoustic parameters (e.g., detected distortion in audio output), or any other suitable characteristic.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110*a* is first introduced and discussed with reference to FIG. 1A. Many of the details, dimensions, angles and other features shown in the Figures are merely illustrative of particular examples of the disclosed technology. Accordingly, other examples can have other details, dimensions, angles and features without departing from the spirit or scope of the disclosure. In addition, those of ordinary skill in the art will appreciate that further examples of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110*a-n*), one or more network microphone devices ("NMDs"), 120 (identified individually as NMDs 120*a-c*), and one or more control devices 130 (identified individually as control devices 130*a* and 130*b*).

As used herein the term "playback device" can generally refer to a network device configured to receive, process, and output data of a media playback system. For example, a playback device can be a network device that receives and processes audio content. In some examples, a playback device includes one or more transducers or speakers powered by one or more amplifiers. In other examples, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some examples, an NMD is a stand-alone device configured primarily for audio detection. In other examples, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain examples, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some examples, for instance, the media playback system 100 is configured to play back audio from a first playback device (e.g., the playback device 110*a*) in synchrony with a second playback device (e.g., the playback device 110*b*). Interactions between the playback devices 110, NMDs 120, and/or control devices 130 of the media playback system 100 configured in accordance with the various examples of the disclosure are described in greater detail below.

In the illustrated example of FIG. 1A, the environment 101 comprises a household having several rooms, spaces, and/or playback zones, including (clockwise from upper left) a master bathroom 101*a*, a master bedroom 101*b*, a second bedroom 101*c*, a family room or den 101*d*, an office 101*e*, a living room 101*f*, a dining room 101*g*, a kitchen 101*h*, and an outdoor patio 101*i*. While certain examples and examples are described below in the context of a home environment, the technologies described herein may be implemented in other types of environments. In some examples, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A. Each zone may be given a name according to a different room or space such as the office 101*e*, master bathroom 101*a*, master bedroom 101*b*, the second bedroom 101*c*, kitchen 101*h*, dining room 101*g*, living room 101*f*, and/or the outdoor patio 101*i*. In some examples, a single playback zone may include multiple rooms or spaces. In certain examples, a single room or space may include multiple playback zones.

In the illustrated example of FIG. 1A, the master bathroom 101*a*, the second bedroom 101*c*, the office 101*e*, the living room 101*f*, the dining room 101*g*, the kitchen 101*h*, and the outdoor patio 101*i* each include one playback device 110, and the master bedroom 101*b* and the den 101*d* include a plurality of playback devices 110. In the master bedroom 101*b*, the playback devices 110*l* and 110*m* may be configured, for example, to play back audio content in synchrony as individual ones of playback devices 110, as a bonded playback zone, as a consolidated playback device, and/or any combination thereof. Similarly, in the den 101*d*, the playback devices 110*h-j* can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B and 1E.

In some examples, one or more of the playback zones in the environment 101 may each be playing different audio content. For instance, a user may be grilling on the patio 101*i* and listening to hip hop music being played by the playback device 110*c* while another user is preparing food in the kitchen 101*h* and listening to classical music played by the playback device 110*b*. In another example, a playback zone may play the same audio content in synchrony with another playback zone. For instance, the user may be in the office 101*e* listening to the playback device 110*f* playing back the same hip hop music being played back by playback device 110*c* on the patio 101*i*. In some examples, the playback devices 110*c* and 110*f* play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
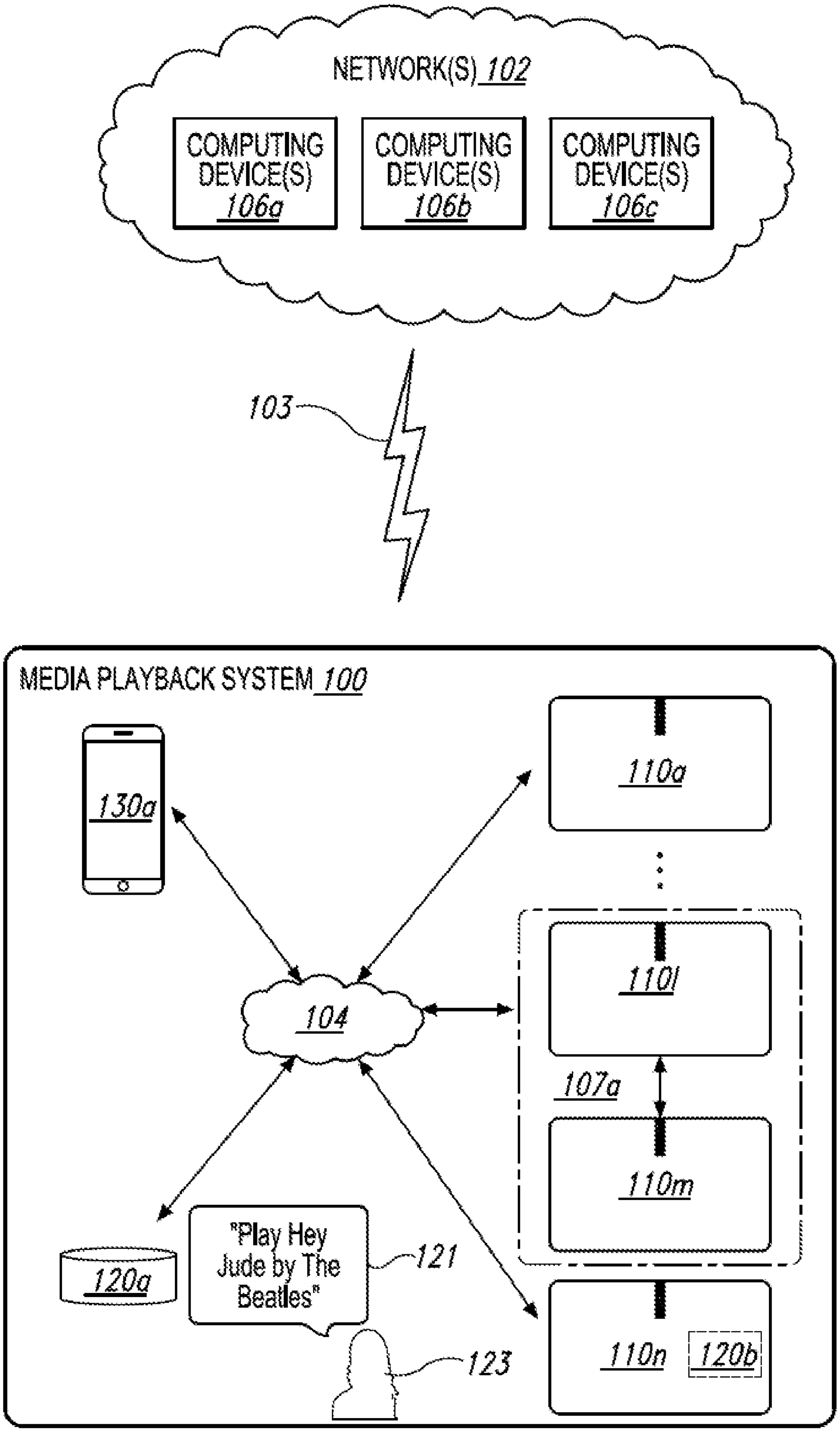
FIG. 1B is a schematic diagram of the media playback system of FIG. 1A and one or more networks.

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some examples, the cloud network 102 is further configured to receive data (e.g. voice input data) from the media playback system 100 and correspondingly transmit commands and/or media content to the media playback system 100.

The cloud network 102 comprises computing devices 106 (identified separately as a first computing device 106*a*, a second computing device 106*b*, and a third computing device 106*c*). The computing devices 106 can comprise individual computers or servers, such as, for example, a media streaming service server storing audio and/or other media content, a voice service server, a social media server, a media playback system control server, etc. In some examples, one or more of the computing devices 106 comprise modules of a single computer or server. In certain examples, one or more of the computing devices 106 comprise one or more modules, computers, and/or servers. Moreover, while the cloud network 102 is described above in the context of a single cloud network, in some examples the cloud network 102 comprises a plurality of cloud networks comprising communicatively coupled computing devices. Furthermore, while the cloud network 102 is shown in FIG. 1B as having three of the computing devices 106, in some examples, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11 ay, 802.15, etc. transmitted at 2.4 Gigahertz (GHz), 5 GHz, and/or another suitable frequency.

In some examples, the network 104 comprises a dedicated communication network that the media playback system 100 uses to transmit messages between individual devices and/or to transmit media content to and from media content sources (e.g., one or more of the computing devices 106). In certain examples, the network 104 is configured to be accessible only to devices in the media playback system 100, thereby reducing interference and competition with other household devices. In other examples, however, the network 104 comprises an existing household communication network (e.g., a household WiFi network). In some examples, the links 103 and the network 104 comprise one or more of the same networks. In some examples, for instance, the links 103 and the network 104 comprise a telecommunication network (e.g., an LTE network, a 5G network). Moreover, in some examples, the media playback system 100 is implemented without the network 104, and devices comprising the media playback system 100 can communicate with each other, for example, via one or more direct connections, PANs, telecommunication networks, and/or other suitable communication links.

In some examples, audio content sources may be regularly added or removed from the media playback system 100. In some examples, for instance, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some examples, the media content database is stored on one or more of the playback devices 110, network microphone devices 120, and/or control devices 130.

In the illustrated example of FIG. 1B, the playback devices 110*l* and 110*m* comprise a group 107*a*. The playback devices 110*l* and 110*m* can be positioned in different rooms in a household and be grouped together in the group 107*a* on a temporary or permanent basis based on user input received at the control device 130*a* and/or another control device 130 in the media playback system 100. When arranged in the group 107*a*, the playback devices 110*l* and 110*m* can be configured to play back the same or similar audio content in synchrony from one or more audio content sources. In certain examples, for instance, the group 107*a* comprises a bonded zone in which the playback devices 110*l* and 110*m* comprise left audio and right audio channels, respectively, of multi-channel audio content, thereby producing or enhancing a stereo effect of the audio content. In some examples, the group 107*a* includes additional playback devices 110. In other examples, however, the media playback system 100 omits the group 107*a* and/or other grouped arrangements of the playback devices 110.

The media playback system 100 includes the NMDs 120*a* and 120*d*, each comprising one or more microphones configured to receive voice utterances from a user. In the illustrated example of FIG. 1B, the NMD 120*a* is a standalone device and the NMD 120*d* is integrated into the playback device 110*n*. The NMD 120*a*, for example, is configured to receive voice input 121 from a user 123. In some examples, the NMD 120*a* transmits data associated with the received voice input 121 to a voice assistant service (VAS) configured to (i) process the received voice input data and (ii) transmit a corresponding command to the media playback system 100. In some example, the computing device 106*c* comprises one or more modules and/or servers of a VAS (e.g., a VAS operated by one or more of SONOS®, AMAZON®, GOOGLE® APPLE®, MICROSOFT®). The computing device 106*c* can receive the voice input data from the NMD 120*a* via the network 104 and the links 103. In response to receiving the voice input data, the computing device 106*c* processes the voice input data (i.e., "Play Hey Jude by The Beatles"), and determines that the processed voice input includes a command to play a song (e.g., "Hey Jude"). The computing device 106*c* accordingly transmits commands to the media playback system 100 to play back "Hey Jude" by the Beatles from a suitable media service (e.g., via one or more of the computing devices 106) on one or more of the playback devices 110.

b. Suitable Playback Devices

Figure 1C:
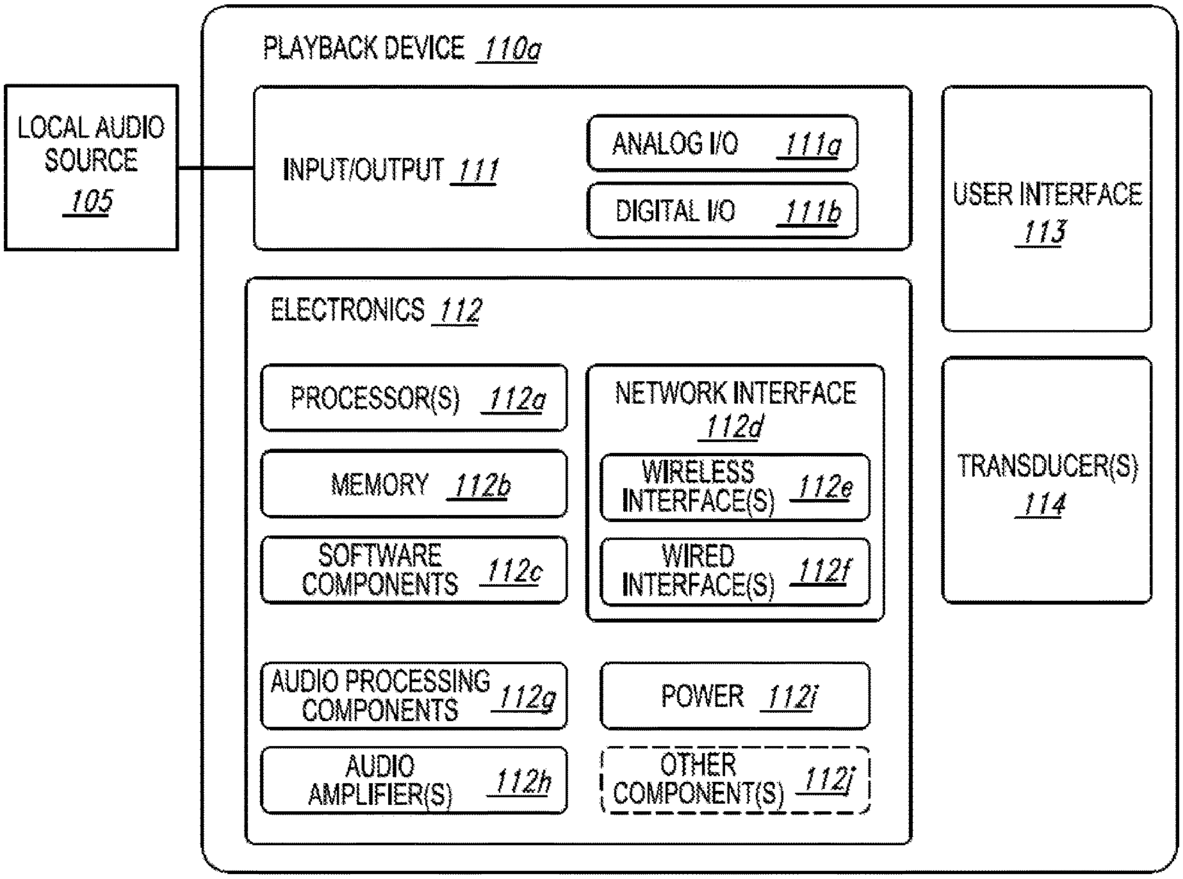
FIG. 1C is a block diagram of a playback device.

FIG. 1C is a block diagram of the playback device 110*a* comprising an input/output 111. The input/output 111 can include an analog I/O 111*a* (e.g., one or more wires, cables, and/or other suitable communication links configured to carry analog signals) and/or a digital I/O 111*b* (e.g., one or more wires, cables, or other suitable communication links configured to carry digital signals). In some examples, the analog I/O 111*a* is an audio line-in input connection comprising, for example, an auto-detecting 3.5 mm audio line-in connection. In some examples, the digital I/O 111*b* comprises a Sony/Philips Digital Interface Format (S/PDIF) communication interface and/or cable and/or a Toshiba Link (TOSLINK) cable. In some examples, the digital I/O 111*b* comprises a High-Definition Multimedia Interface (HDMI) interface and/or cable. In some examples, the digital I/O 111*b* includes one or more wireless communication links comprising, for example, a radio frequency (RF), infrared, WiFi, Bluetooth, or another suitable communication protocol. In certain examples, the analog I/O 111*a* and the digital 111*b* comprise interfaces (e.g., ports, plugs, jacks) configured to receive connectors of cables transmitting analog and digital signals, respectively, without necessarily including cables.

The playback device 110*a*, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some examples, the local audio source 105 includes local music libraries on a smartphone, a computer, a networked-attached storage (NAS), and/or another suitable device configured to store media files. In certain examples, one or more of the playback devices 110, NMDs 120, and/or control devices 130 comprise the local audio source 105. In other examples, however, the media playback system omits the local audio source 105 altogether. In some examples, the playback device 110*a* does not include an input/output 111 and receives all audio content via the network 104.

The playback device 110*a* further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106*a-c* via the network 104 (FIG. 1B)), amplify the received audio, and output the amplified audio for playback via one or more of the transducers 114. In some examples, the playback device 110*a* optionally includes one or more microphones 115 (e.g., a single microphone, a plurality of microphones, a microphone array) (hereinafter referred to as "the microphones 115"). In certain examples, for instance, the playback device 110*a* having one or more of the optional microphones 115 can operate as an NMD configured to receive voice input from a user and correspondingly perform one or more operations based on the received voice input.

In the illustrated example of FIG. 1C, the electronics 112 comprise one or more processors 112*a* (referred to hereinafter as "the processors 112*a*"), memory 112*b*, software components 112*c*, a network interface 112*d*, one or more audio processing components 112*g* (referred to hereinafter as "the audio components 112*g*"), one or more audio amplifiers 112*h* (referred to hereinafter as "the amplifiers 112*h*"), and power 112*i* (e.g., one or more power supplies, power cables, power receptacles, batteries, induction coils, Power-over Ethernet (POE) interfaces, and/or other suitable sources of electric power). In some examples, the electronics 112 optionally include one or more other components 112*j* (e.g., one or more sensors, video displays, touchscreens, battery charging bases).

The processors 112*a* can comprise clock-driven computing component(s) configured to process data, and the memory 112*b* can comprise a computer-readable medium (e.g., a tangible, non-transitory computer-readable medium, data storage loaded with one or more of the software components 112*c*) configured to store instructions for performing various operations and/or functions. The processors 112*a* are configured to execute the instructions stored on the memory 112*b* to perform one or more of the operations. The operations can include, for example, causing the playback device 110*a* to retrieve audio data from an audio source (e.g., one or more of the computing devices 106*a-c* (FIG. 1B)), and/or another one of the playback devices 110. In some examples, the operations further include causing the playback device 110*a* to send audio data to another one of the playback devices 110*a* and/or another device (e.g., one of the NMDs 120). Certain examples include operations causing the playback device 110*a* to pair with another of the one or more playback devices 110 to enable a multi-channel audio environment (e.g., a stereo pair, a bonded zone).

The processors 112*a* can be further configured to perform operations causing the playback device 110*a* to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110*a* and the other one or more other playback devices 110. Additional details regarding audio playback synchronization among playback devices can be found, for example, in U.S. Pat. No. 8,234,395, which was incorporated by reference above.

In some examples, the memory 112*b* is further configured to store data associated with the playback device 110*a*, such as one or more zones and/or zone groups of which the playback device 110*a* is a member, audio sources accessible to the playback device 110*a*, and/or a playback queue that the playback device 110*a* (and/or another of the one or more playback devices) can be associated with. The stored data can comprise one or more state variables that are periodically updated and used to describe a state of the playback device 110*a*. The memory 112*b* can also include data associated with a state of one or more of the other devices (e.g., the playback devices 110, NMDs 120, control devices 130) of the media playback system 100. In some examples, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112*d* is configured to facilitate a transmission of data between the playback device 110*a* and one or more other devices on a data network such as, for example, the links 103 and/or the network 104 (FIG. 1B). The network interface 112*d* is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112*d* can parse the digital packet data such that the electronics 112 properly receives and processes the data destined for the playback device 110*a*.

In the illustrated example of FIG. 1C, the network interface 112*d* comprises one or more wireless interfaces 112*e* (referred to hereinafter as "the wireless interface 112*e*"). The wireless interface 112*e* (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some examples, the network interface 112*d* optionally includes a wired interface 112*f* (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain examples, the network interface 112*d* includes the wired interface 112*f* and excludes the wireless interface 112*e*. In some examples, the electronics 112 excludes the network interface 112*d* altogether and transmits and receives media content and/or other data via another communication path (e.g., the input/output 111).

The audio components 112*g* are configured to process and/or filter data comprising media content received by the electronics 112 (e.g., via the input/output 111 and/or the network interface 112*d*) to produce output audio signals. In some examples, the audio processing components 112*g* comprise, for example, one or more digital-to-analog converters (DAC), audio preprocessing components, audio enhancement components, a digital signal processors (DSPs), and/or other suitable audio processing components, modules, circuits, etc. In certain examples, one or more of the audio processing components 112*g* can comprise one or more subcomponents of the processors 112*a*. In some examples, the electronics 112 omits the audio processing components 112*g*. In some examples, the processors 112*a* execute instructions stored on the memory 112*b* to perform audio processing operations to produce the output audio signals.

The amplifiers 112*h* are configured to receive and amplify the audio output signals produced by the audio processing components 112*g* and/or the processors 112*a*. The amplifiers 112*h* can comprise electronic devices and/or components configured to amplify audio signals to levels sufficient for driving one or more of the transducers 114. In some examples, the amplifiers 112*h* include one or more switching or class-D power amplifiers. In other examples, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain examples, the amplifiers 112*h* comprise a suitable combination of two or more of the foregoing types of power amplifiers. Moreover, in some examples, individual ones of the amplifiers 112*h* correspond to individual ones of the transducers 114. In other examples, however, the electronics 112 includes a single one of the amplifiers 112*h* configured to output amplified audio signals to a plurality of the transducers 114. In some other examples, the electronics 112 omits the amplifiers 112*h*.

The transducers 114 (e.g., one or more speakers and/or speaker drivers) receive the amplified audio signals from the amplifier 112*h* and render or output the amplified audio signals as sound (e.g., audible sound waves having a frequency between about 20 Hertz (Hz) and 20 kilohertz (kHz)). In some examples, the transducers 114 can comprise a single transducer. In other examples, however, the transducers 114 comprise a plurality of audio transducers. In some examples, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain examples, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

Figure 1D:
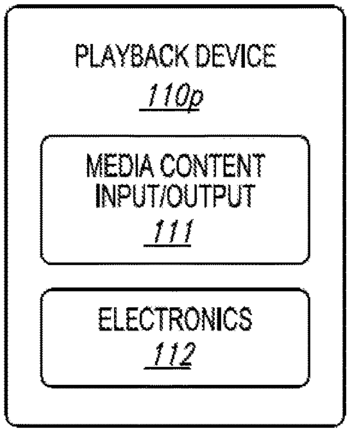
FIG. 1D is a block diagram of a playback device.

By way of illustration, SONOS, Inc. presently offers (or has offered) for sale certain playback devices including, for example, a "SONOS ONE," "MOVE," "SONOS FIVE," "BEAM," "ARC," "PLAYBAR," "PLAYBASE," "PORT," "BOOST," "AMP," and "SUB." Other suitable playback devices may additionally or alternatively be used to implement the playback devices of examples disclosed herein. Additionally, one of ordinary skilled in the art will appreciate that a playback device is not limited to the examples described herein or to SONOS product offerings. In some examples, one or more playback devices 110 comprises wired or wireless headphones (e.g., over-the-ear headphones, on-ear headphones, in-ear earphones). In other examples, one or more of the playback devices 110 comprise a docking station and/or an interface configured to interact with a docking station for personal mobile media playback devices. In certain examples, a playback device may be integral to another device or component such as a television, a lighting fixture, or some other device for indoor or outdoor use. In some examples, a playback device omits a user interface and/or one or more transducers. For example, FIG. 1D is a block diagram of a playback device 110*p* comprising the input/output 111 and electronics 112 without the user interface 113 or transducers 114.

Figure 1E:
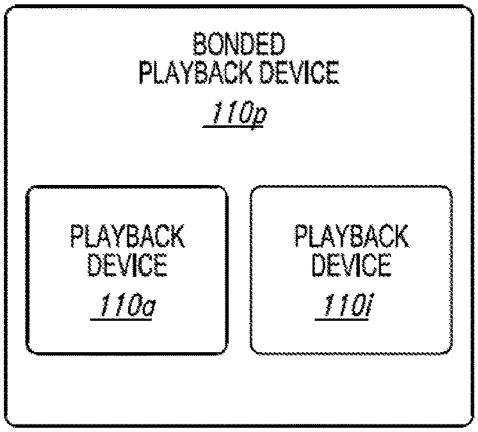
FIG. 1E is a block diagram of a network microphone device.

FIG. 1E is a block diagram of a bonded playback device 110*q* comprising the playback device 110*a* (FIG. 1C) sonically bonded with the playback device 110*i* (e.g., a subwoofer) (FIG. 1A). In the illustrated example, the playback devices 110*a* and 110*i* are separate ones of the playback devices 110 housed in separate enclosures. In some examples, however, the bonded playback device 110*q* comprises a single enclosure housing both the playback devices 110*a* and 110*i*. The bonded playback device 110*q* can be configured to process and reproduce sound differently than an unbonded playback device (e.g., the playback device 110*a* of FIG. 1C) and/or paired or bonded playback devices (e.g., the playback devices 110*l* and 110*m* of FIG. 1B). In some examples, the playback device 110*a* is full-range playback device configured to render low frequency, mid-range frequency, and high frequency audio content, and the playback device 110*i* is a subwoofer configured to render low frequency audio content. In some examples, the playback device 110*a*, when bonded with the first playback device, is configured to render only the mid-range and high frequency components of a particular audio content, while the playback device 110*i* renders the low frequency component of the particular audio content. In some examples, the bonded playback device 110*q* includes additional playback devices and/or another bonded playback device. Additional playback device examples are described in further detail below with respect to FIGS. 2A-2C.

c. Suitable Network Microphone Devices (NMDs)

Figure 1F:
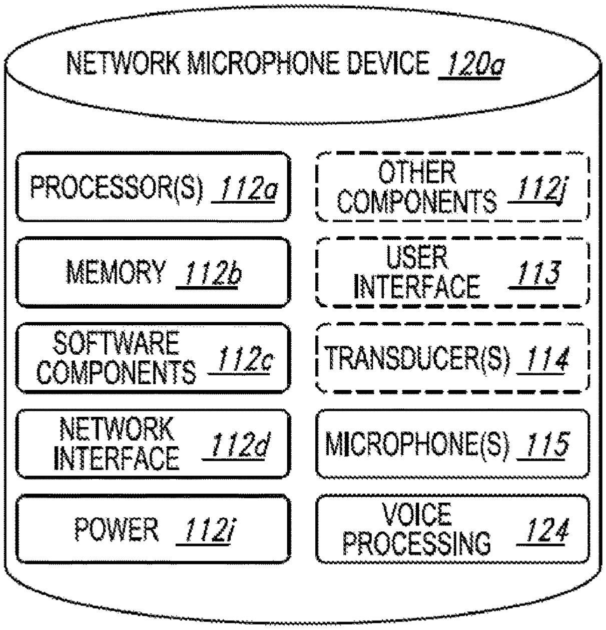
FIG. 1F is a block diagram of a network microphone device.

FIG. 1F is a block diagram of the NMD 120*a* (FIGS. 1A and 1B). The NMD 120*a* includes one or more voice processing components 124 (hereinafter "the voice components 124") and several components described with respect to the playback device 110*a* (FIG. 1C) including the processors 112*a*, the memory 112*b*, and the microphones 115. The NMD 120*a* optionally comprises other components also included in the playback device 110*a* (FIG. 1C), such as the user interface 113 and/or the transducers 114. In some examples, the NMD 120*a* is configured as a media playback device (e.g., one or more of the playback devices 110), and further includes, for example, one or more of the audio components 112*g* (FIG. 1C), the amplifiers 114, and/or other playback device components. In certain examples, the NMD 120*a* comprises an Internet of Things (IoT) device such as, for example, a thermostat, alarm panel, fire and/or smoke detector, etc. In some examples, the NMD 120*a* comprises the microphones 115, the voice processing components 124, and only a portion of the components of the electronics 112 described above with respect to FIG. 1B. In some examples, for instance, the NMD 120*a* includes the processor 112*a* and the memory 112*b* (FIG. 1B), while omitting one or more other components of the electronics 112. In some examples, the NMD 120*a* includes additional components (e.g., one or more sensors, cameras, thermometers, barometers, hygrometers).

Figure 1G:
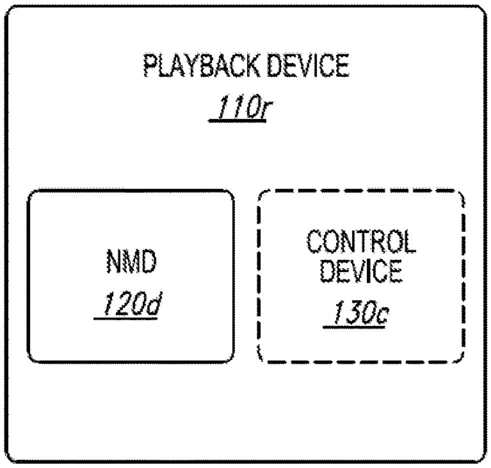
FIG. 1G is a block diagram of a playback device.

In some examples, an NMD can be integrated into a playback device. FIG. 1G is a block diagram of a playback device 110*r* comprising an NMD 120*d*. The playback device 110*r* can comprise many or all of the components of the playback device 110*a* and further include the microphones 115 and voice processing components 124 (FIG. 1F). The playback device 110*r* optionally includes an integrated control device 130*c*. The control device 130*c* can comprise, for example, a user interface (e.g., the user interface 113 of FIG. 1B) configured to receive user input (e.g., touch input, voice input) without a separate control device. In other examples, however, the playback device 110*r* receives commands from another control device (e.g., the control device 130*a* of FIG. 1B).

Referring again to FIG. 1F, the microphones 115 are configured to acquire, capture, and/or receive sound from an environment (e.g., the environment 101 of FIG. 1A) and/or a room in which the NMD 120*a* is positioned. The received sound can include, for example, vocal utterances, audio played back by the NMD 120*a* and/or another playback device, background voices, ambient sounds, etc. The microphones 115 convert the received sound into electrical signals to produce microphone data. The voice processing components 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home.

d. Suitable Control Devices

Figure 1H:
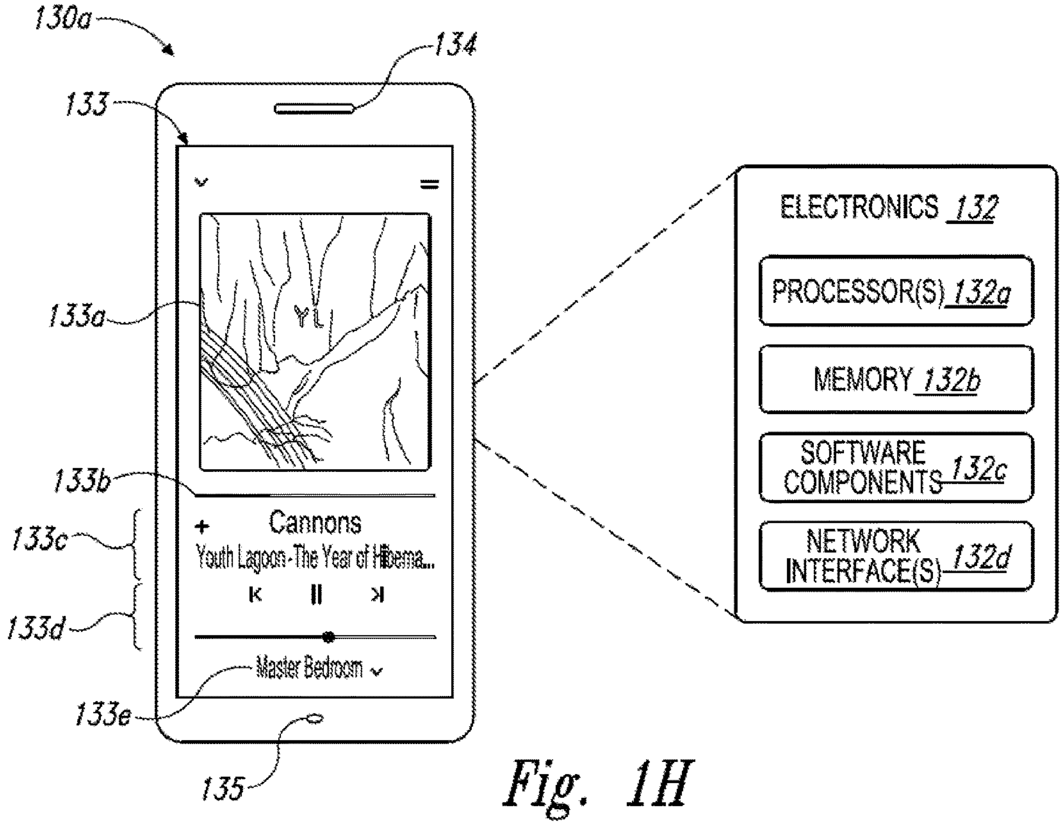
FIG. 1H is a partially schematic diagram of a control device.

FIG. 1H is a partially schematic diagram of the control device 130*a* (FIGS. 1A and 1B). As used herein, the term "control device" can be used interchangeably with "controller" or "control system." Among other features, the control device 130*a* is configured to receive user input related to the media playback system 100 and, in response, cause one or more devices in the media playback system 100 to perform an action(s) or operation(s) corresponding to the user input. In the illustrated example, the control device 130*a* comprises a smartphone (e.g., an iPhone™. an Android phone) on which media playback system controller application software is installed. In some examples, the control device 130*a* comprises, for example, a tablet (e.g., an iPad™), a computer (e.g., a laptop computer, a desktop computer), and/or another suitable device (e.g., a television, an automobile audio head unit, an IoT device). In certain examples, the control device 130*a* comprises a dedicated controller for the media playback system 100. In other examples, as described above with respect to FIG. 1G, the control device 130*a* is integrated into another device in the media playback system 100 (e.g., one more of the playback devices 110, NMDs 120, and/or other suitable devices configured to communicate over a network).

The control device 130*a* includes electronics 132, a user interface 133, one or more speakers 134, and one or more microphones 135. The electronics 132 comprise one or more processors 132*a* (referred to hereinafter as "the processors 132*a*"), a memory 132*b*, software components 132*c*, and a network interface 132*d*. The processor 132*a* can be configured to perform functions relevant to facilitating user access, control, and configuration of the media playback system 100. The memory 132*b* can comprise data storage that can be loaded with one or more of the software components executable by the processor 132*a* to perform those functions. The software components 132*c* can comprise applications and/or other executable software configured to facilitate control of the media playback system 100. The memory 112*b* can be configured to store, for example, the software components 132*c*, media playback system controller application software, and/or other data associated with the media playback system 100 and the user.

The network interface 132*d* is configured to facilitate network communications between the control device 130*a* and one or more other devices in the media playback system 100, and/or one or more remote devices. In some examples, the network interface 132*d* is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132*d* can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface **132*d* can transmit a playback device control command (e.g., volume control, audio playback control, audio content selection) from the control device 130 to one or more of the playback devices 110. The network interface 132*d* can also transmit and/or receive configuration changes such as, for example, adding/removing one or more playback devices 110** to/from a zone, adding/removing one or more zones to/from a zone group, forming a bonded or consolidated player, separating one or more playback devices from a bonded or consolidated player, among others.

The user interface 133 is configured to receive user input and can facilitate control of the media playback system 100. The user interface 133 includes media content art 133a (e.g., album art, lyrics, videos), a playback status indicator **133*b* (e.g., an elapsed and/or remaining time indicator), media content information region 133*c*, a playback control region 133*d*, and a zone indicator 133*e*. The media content information region 133*c* can include a display of relevant information (e.g., title, artist, album, genre, release year) about media content currently playing and/or media content in a queue or playlist. The playback control region 133*d* can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133*d* may also include selectable icons to modify equalization settings, playback volume, and/or other suitable playback actions. In the illustrated example, the user interface 133** comprises a display presented on a touch screen interface of a smartphone (e.g., an iPhone™, an Android phone). In some examples, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device **130*a*. In some examples, the one or more speakers comprise individual transducers configured to correspondingly output low frequencies, mid-range frequencies, and/or high frequencies. In some examples, the control device 130*a* is configured as a playback device (e.g., one of the playback devices 110). Similarly, in some examples the control device 130*a* is configured as an NMD (e.g., one of the NMDs 120), receiving voice commands and other sounds via the one or more microphones 135**.

The one or more microphones 135 can comprise, for example, one or more condenser microphones, electret condenser microphones, dynamic microphones, and/or other suitable types of microphones or transducers. In some examples, two or more of the microphones 135 are arranged to capture location information of an audio source (e.g., voice, audible sound) and/or configured to facilitate filtering of background noise. Moreover, in certain examples, the control device **130*a* is configured to operate as playback device and an NMD. In other examples, however, the control device 130*a* omits the one or more speakers 134 and/or the one or more microphones 135. For instance, the control device 130*a* may comprise a device (e.g., a thermostat, an IoT device, a network device) comprising a portion of the electronics 132 and the user interface 133** (e.g., a touch screen) without any speakers or microphones.

III. Example Systems and Devices

Figure 2A:
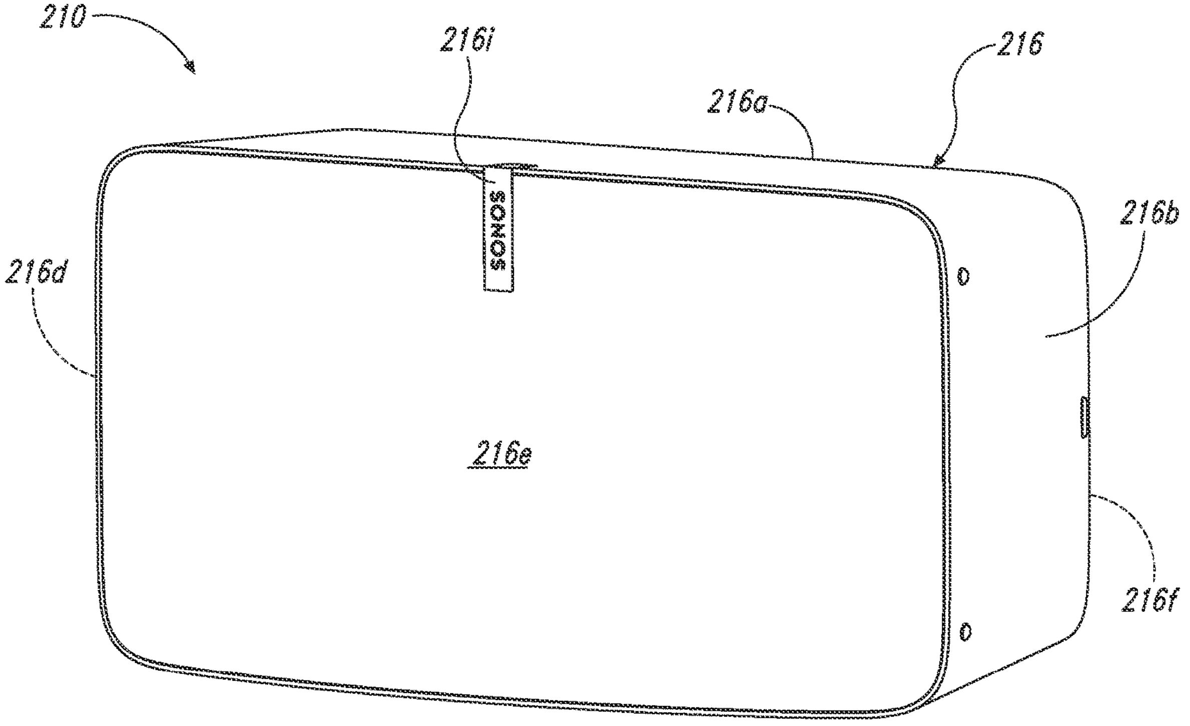
FIG. 2A is a front isometric view of a playback device configured in accordance with examples of the disclosed technology.
Figure 2B:
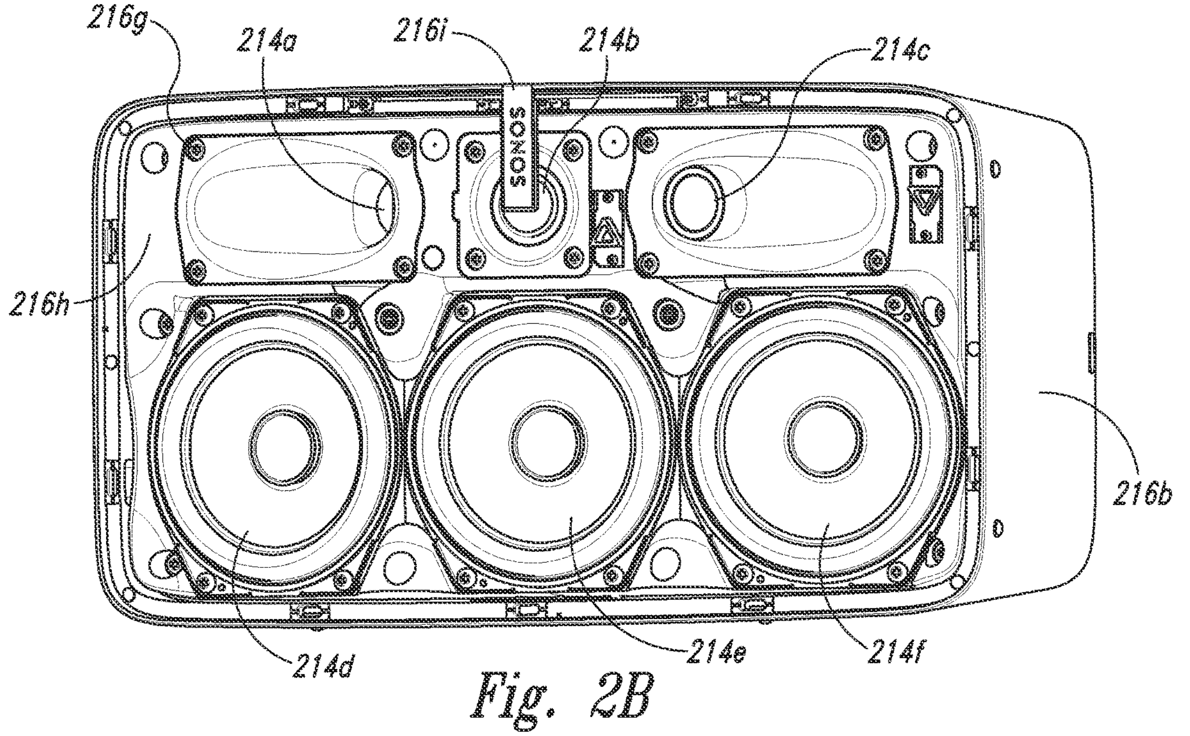
FIG. 2B is a front isometric view of the playback device of FIG. 2A without a grille.
Figure 2C:
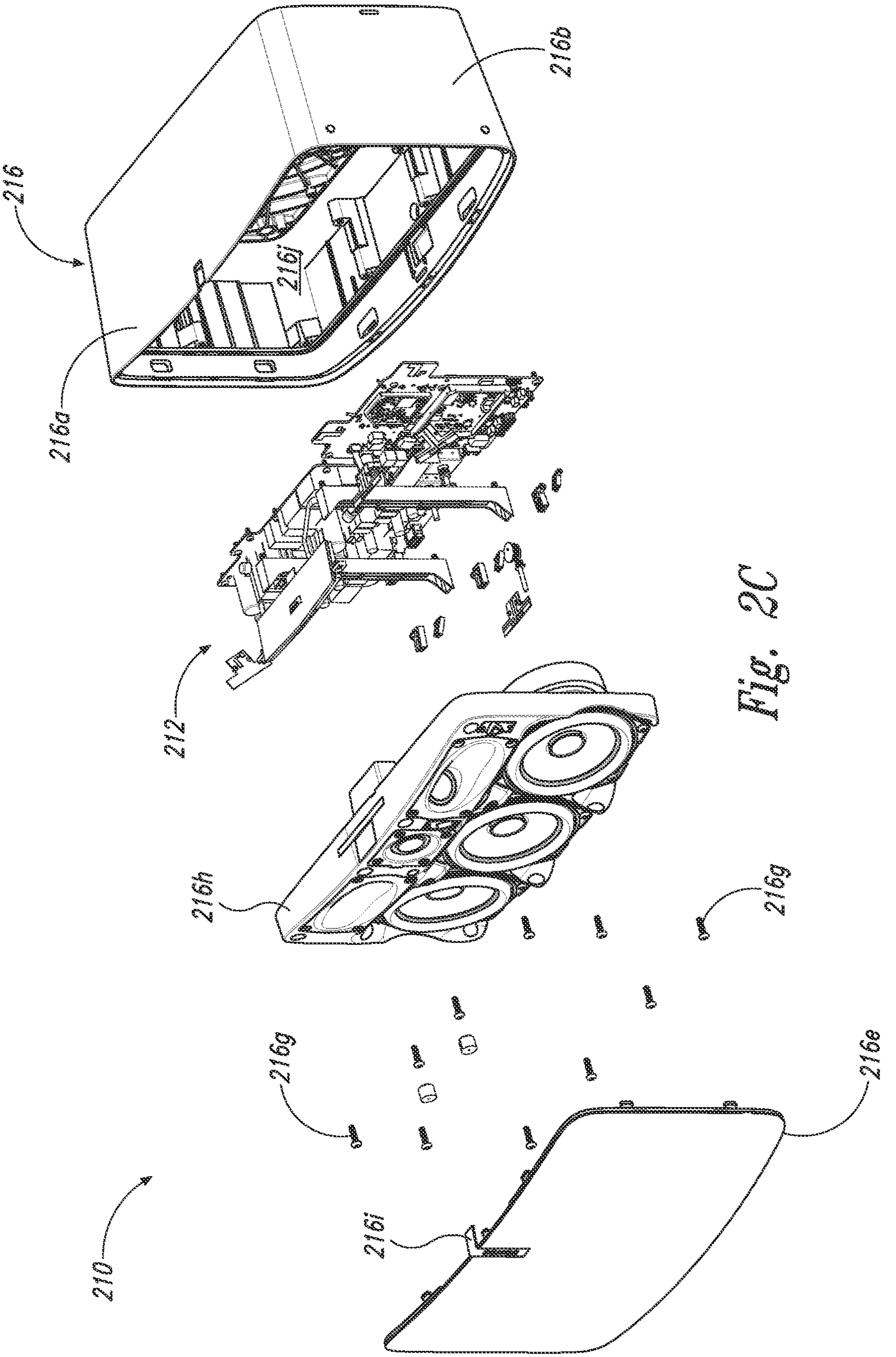
FIG. 2C is an exploded view of the playback device of FIG. 2A.

FIG. 2A is a front isometric view of a playback device 210 configured in accordance with examples of the disclosed technology. FIG. 2B is a front isometric view of the playback device 210 without a grille **216*e*. FIG. 2C is an exploded view of the playback device 210. Referring to FIGS. 2A-2C together, the playback device 210 comprises a housing 216 that includes an upper portion 216*a*, a right or first side portion 216*b*, a lower portion 216*c*, a left or second side portion 216*d*, the grille 216*e*, and a rear portion 216*f* A plurality of fasteners 216*g* (e.g., one or more screws, rivets, clips) attaches a frame 216*h* to the housing 216. A cavity 216*j* (FIG. 2C) in the housing 216 is configured to receive the frame 216*h* and electronics 212. The frame 216*h* is configured to carry a plurality of transducers 214 (identified individually in FIG. 2B as transducers 214*a-f*). The electronics 212 (e.g., the electronics 112 of FIG. 1C) is configured to receive audio content from an audio source and send electrical signals corresponding to the audio content to the transducers 214** for playback.

The transducers 214 are configured to receive the electrical signals from the electronics 112, and further configured to convert the received electrical signals into audible sound during playback. For instance, the transducers **214*a-c* (e.g., tweeters) can be configured to output high frequency sound (e.g., sound waves having a frequency greater than about 2 kHz). The transducers 214*d-f* (e.g., mid-woofers, woofers, midrange speakers) can be configured output sound at frequencies lower than the transducers 214*a-c* (e.g., sound waves having a frequency lower than about 2 kHz). In some examples, the playback device 210 includes a number of transducers different than those illustrated in FIGS. 2A-2C. For example, as described in further detail below with respect to FIGS. 3A-3C, the playback device 210 can include fewer than six transducers (e.g., one, two, three). In other examples, however, the playback device 210 includes more than six transducers (e.g., nine, ten). Moreover, in some examples, all or a portion of the transducers 214 are configured to operate as a phased array to desirably adjust (e.g., narrow or widen) a radiation pattern of the transducers 214, thereby altering a user's perception of the sound emitted from the playback device 210**.

In the illustrated example of FIGS. 2A-2C, a filter **216*i* is axially aligned with the transducer 214*b*. The filter 216*i* can be configured to desirably attenuate a predetermined range of frequencies that the transducer 214*b* outputs to improve sound quality and a perceived sound stage output collectively by the transducers 214. In some examples, however, the playback device 210 omits the filter 216*i*. In other examples, the playback device 210 includes one or more additional filters aligned with the transducers 214*b* and/or at least another of the transducers 214**.

Figure 3A:
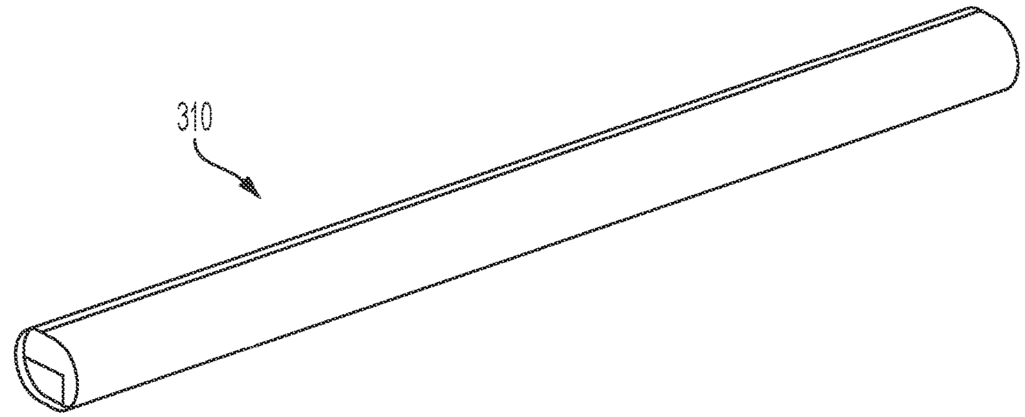
FIGS. 3A and 3B are partially schematic isometric views of an audio playback device configured in accordance with examples of the disclosed technology.
Figure 3B:
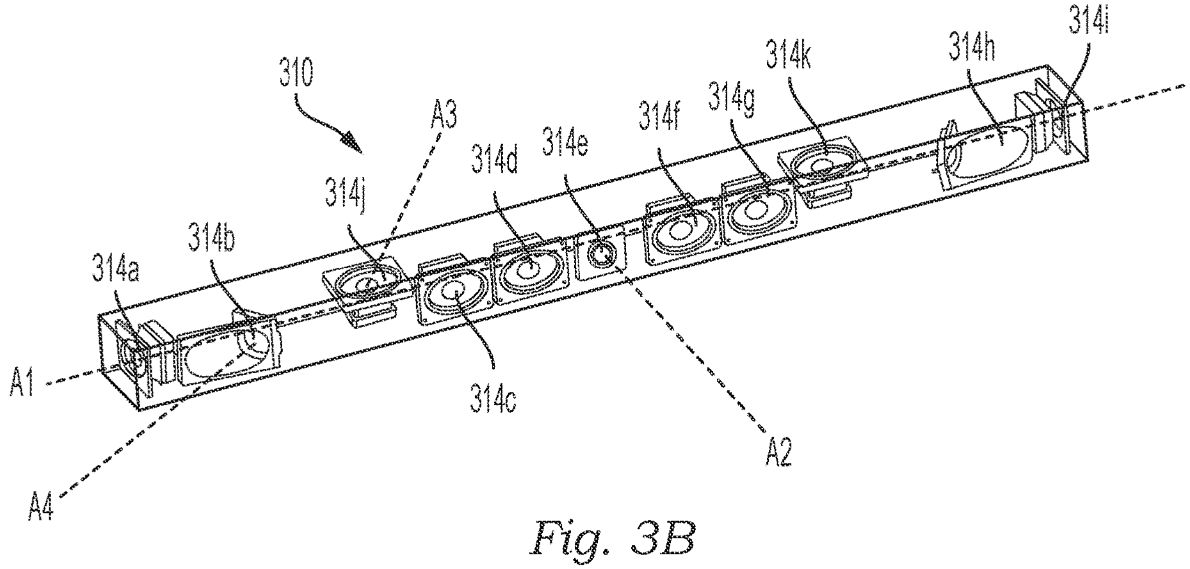

FIG. 3A is a perspective view of an audio playback device 310, and FIG. 3B shows the device 310 with the outer body drawn transparently to illustrate the plurality of transducers **314*a-k* therein (collectively "transducers 314"). The transducers 314 can be similar or identical to any one of the transducers 214*a-f* described previously. In this example, the playback device 310 takes the form of a soundbar that is elongated along a horizontal axis A1 and is configured to face along a primary sound axis A2 that is substantially orthogonal to the first horizontal axis A1. In other examples, the playback device 310 can assume other forms, for example having more or fewer transducers, having other form-factors, or having any other suitable modifications with respect to the example shown in FIGS. 3A and 3**B.

The playback device 310 can include individual transducers 314*a-k* oriented in different directions or otherwise configured to direct sound along different sound axes. For example, the transducers 314*c-g* can be configured to direct sound primarily along directions parallel to the primary sound axis A2 of the playback device 310. Additionally, the playback device 310 can include left and right up-firing transducers (e.g., transducers 314*j* and 314*k*) that are configured to direct sound along axes that are angled vertically with respect to the primary sound axis A2. For example, the left up-firing transducer 314*j* is configured to direct sound along the axis A3, which is vertically angled with respect to the horizontal primary axis A2. In some examples, the up-firing sound axis A3 can be angled with respect to the primary sound axis A2 by between about 50 degrees and about 90 degrees, between about 60 degrees and about 80 degrees, or about 70 degrees.

The playback device 310 can also include one or more side-firing transducers (e.g., transducers 314*a*, 314*b*, 314*h*, and 314*i*), which can direct sound along axes that are horizontally angled with respect to the primary sound axis A2. In the illustrated example, the outermost transducers 314*a* and 314*i* can be configured to direct sound primarily along the first horizontal axis A1 or at least partially horizontally angled therefrom, while the side-firing transducers 314*b* and 314*h* are configured to direct sound along an axis that lies between the axes A1 and A2. For example, the left side-firing transducer 314*b* is configured to direct sound along axis A4.

In operation, the playback device 310 can be utilized to play back 3D audio content that includes a vertical component. As noted previously, certain 3D audio or other immersive audio formats include one or more vertical channels in addition to any lateral (e.g., left, right, front) channels. Examples of such 3D audio formats include DOLBY ATMOS, MPEG-H, and DTS:X formats. Additional details of the playback device 310 of FIGS. 3A and 3B are disclosed in U.S. Provisional Patent Application 62/940,640, SYSTEMS AND METHODS OF SPATIAL AUDIO PLAYBACK WITH ENHANCED IMMERSIVENESS, filed Nov. 26, 2019, the disclosure of which is incorporated herein by reference in its entirety.

IV. Distributing and Playing Back Low-Frequency Audio Content

Audio playback devices in a bonded zone (e.g., a home theater zone) and/or group typically play back audio content of a channel assigned as the playback responsibility of the particular player. The playback responsibility may be assigned, however, without any regard to the capabilities of the various playback devices in the bonded zone. For example, a soundbar (e.g., playback device 310) may be assigned the center channel and left/right front channels, which represents most of multichannel audio content. Soundbars, however, usually have a form factor that is less conducive to outputting lower frequencies and may be less capable of outputting lower frequencies than other players in the zone (e.g., playback device 210 shown in FIG. 2A, which may serve as a left or right surround device within the zone). Moreover, when a subwoofer is included in the zone, the subwoofer may be assigned all the low-frequency audio content in the multichannel audio that is less than a crossover frequency (e.g., 80 Hz, 125 Hz, etc.) without any regard to the capabilities of the other playback devices in the zone.

Examples of the present technology improve upon this approach by intelligently distributing audio content (e.g., low-frequency content) among various playback devices within a bonded zone based at least in part on the playback capabilities of those devices. By leveraging the known capabilities of the playback devices in a bonded zone, for example, the low-frequency portion of the multichannel audio content can be routed to those playback devices most capable of playing back the low-frequency content, regardless of their other playback responsibilities. As one example, a bass-capable left surround playback device may be assigned to play back at least a portion of the low-frequency content in the center channel in addition to playing back the full content of the left-surround channel. As another example, in a bonded zone that includes a subwoofer, a bass-capable left-surround playback device may be assigned to play back at least a portion of the low-frequency effects (LFE) content in conjunction with the subwoofer.

Figure 4A:
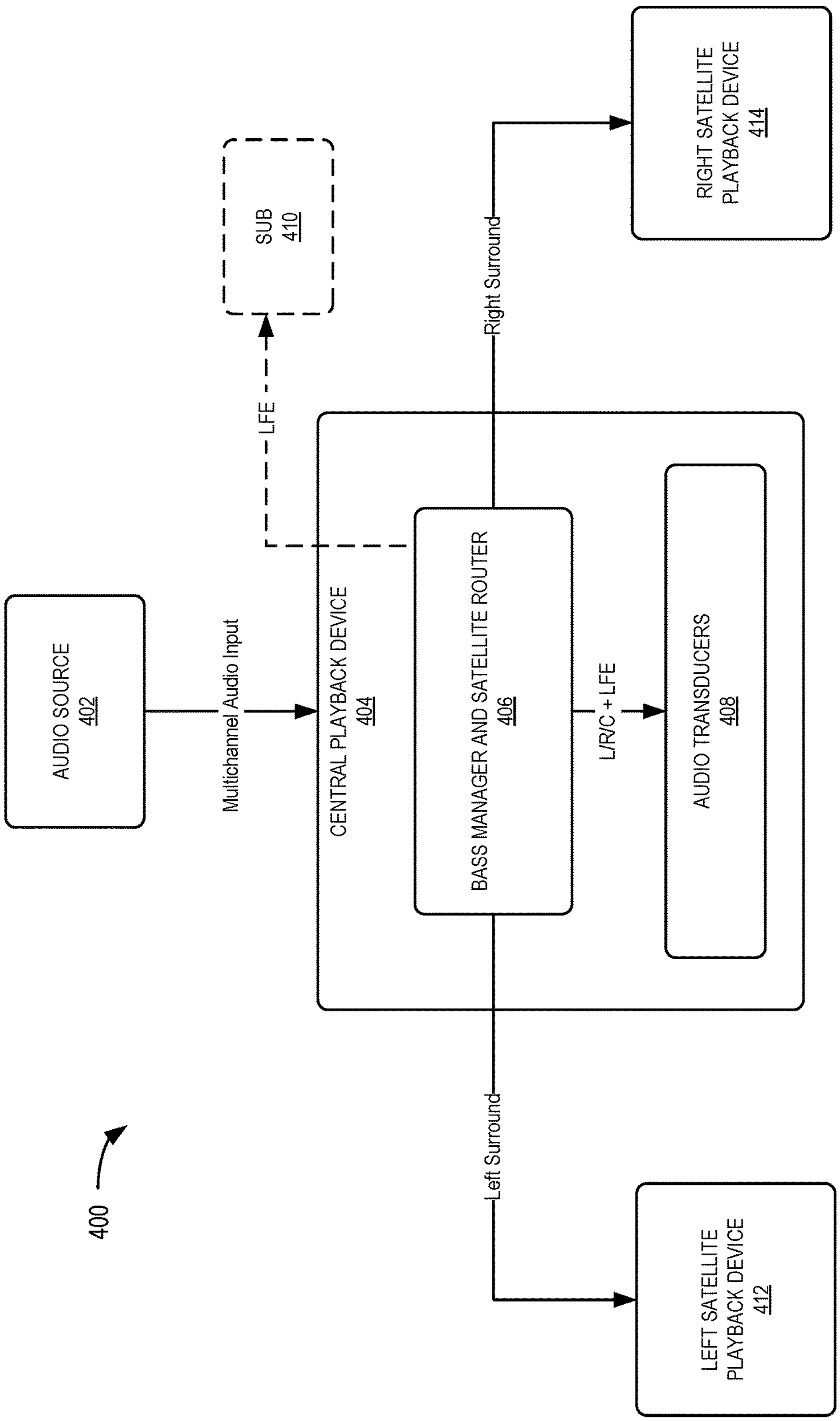
FIG. 4A is a schematic functional block diagram of an audio playback system while in a first operating mode configured in accordance with examples of the disclosed technology.
Figure 4B:
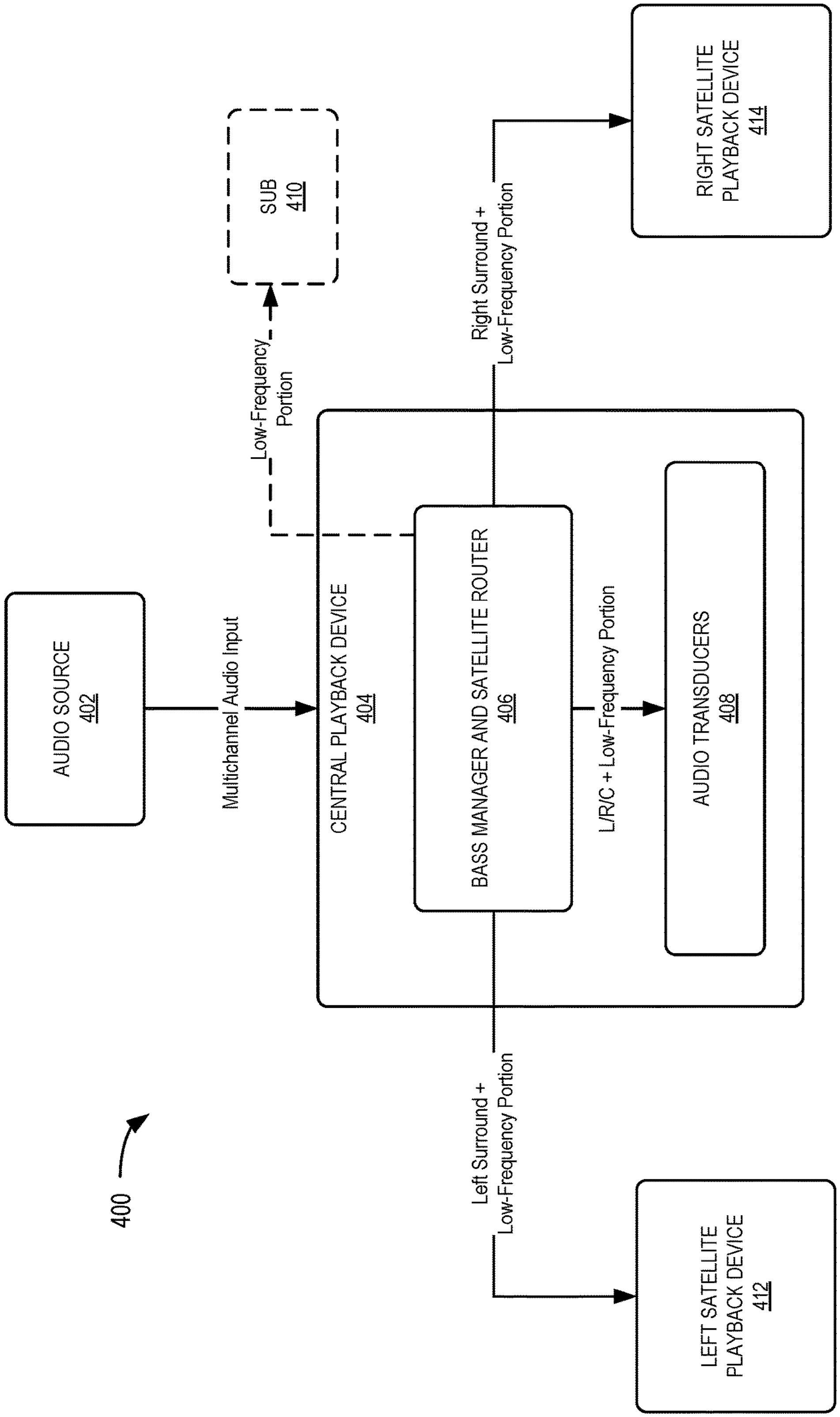
FIG. 4B is a schematic functional block diagram of the audio playback system of FIG. 4B while in a second operating mode.

FIGS. 4A and 4B are schematic block diagrams of an audio playback system 400 that includes a plurality of playback devices in a bonded zone (e.g., a home theatre zone). FIG. 4A illustrates the audio playback system 400 operating in a first mode, and FIG. 4B illustrates the audio playback system 400 operating in a second mode, as described in more detail below.

With reference to FIG. 4A, the audio playback system 400 includes a first or central playback device 404 configured to receive multichannel audio input from an audio source 402. In various examples, the first playback device 404 can take the form of a soundbar (e.g., playback device 310 of FIGS. 3A and 3B) or any other suitable playback device. In some examples, for instance, the first playback device 404 comprises a device, such as a Sonos AMP, configured to process audio and send the processed audio to individual playback devices without itself playing audio directly. In some examples, the first playback device 404 comprises a television or another multichannel audio source.

The first playback device 404 can receive the multichannel audio input via a wired or wireless connection, and the audio source 402 can be a local source (e.g., a wired audio output from a television) or a remote source (e.g., streamed audio content from a remote media server). In various examples, the multichannel audio input can include any number of channels encoded in any number of formats. For example, the multichannel audio input can have 2, 3, 4, 5, 6, 7, 8, 9 or more separate channels. In various examples, the multichannel audio input can take the form of 3.1, 5.1, 6.1, 7.1, 7.2, 9.1, 9.2, 11.1, 11.2, 22.2 audio input, or any suitable three-dimensional, spatial audio, and/or object-based audio format such as Dolby Atmos, DTS:X, Auro-3D, or others. Additionally, while several examples herein relate to 5.1 audio content and a home theatre zone with a central playback device (e.g., a soundbar), left and right surrounds, and optionally one or more subwoofers, the present technology can be applied in other environments, for example having more or fewer full-channel playback devices (e.g., discrete front left and front right devices, discrete vertical playback devices) and having more or fewer low-frequency playback devices (e.g., one, two, three or more discrete subwoofer playback devices).

As shown in FIG. 4A, the first playback device 404 includes a bass manager and satellite router 406 (referred to herein as "bass manager 406") that can take the form of any suitable hardware and/or software components or combination of components configured to process the multichannel audio input received from the audio source 402 and distribute the audio to various devices in the zone for playback. In some examples, the bass manager 406 is configured to (i) extract a low-frequency portion of the multichannel audio content across some or all of the channels and (ii) route the low-frequency portion of the audio content to appropriate playback device(s) for playback, in addition to routing other audio content to appropriate playback devices.

The first playback device 404 also includes a plurality of audio transducers 408. The first playback device 404 is also communicatively coupled to other playback devices within the zone: an optional subwoofer 410, a left satellite playback device 412, and a right satellite playback device 414. In at least some examples, the subwoofer is configured to play back only low-frequency content, while the left satellite playback device 412 and the right satellite playback device 414 are each configured to play back full-frequency audio content.

In the example shown in FIG. 4A, the playback system 400 operates in a first mode, in which the bass manager 406 routes LFE content to the subwoofer 410 (if present), while routing left, right, and center content to transducers 408 of the first playback device 404, routing left surround content to the left satellite playback device 412, and routing right surround content to the right satellite playback device 414. In examples in which the subwoofer 410 is omitted, the LFE content can be played back via the transducers 408 of the first playback device 404. This arrangement is most suitable for instances in which the bass capabilities of the left and right satellite playback devices 412, 414 are lower than the bass capability of the first playback device 404 and/or the subwoofer 410.

As noted previously, in some cases it can be useful to route at least some low-frequency content to other playback devices (e.g., left and right satellite playback devices 412 and 414). This may be particularly useful when the left and right satellite playback devices 412 and 414 are highly bass capable, for example having a bass-output capability that is substantially similar to or greater than that of the first playback device 404. In such instances, the playback system 400 can operate in a second mode, illustrated in FIG. 4B.

As shown in FIG. 4B, the bass manager 406 can process the multichannel audio input and route portions of the audio input to appropriate playback devices within the home theatre zone. However, while in the second mode, the bass manager 406 can process the input to separately route low-frequency portion(s) of the input channels to various devices with the zone for playback, irrespective of the channel from which the low-frequency content originated. In various examples, low-frequency portions of the audio content can include audio content that falls below a particular frequency threshold (e.g., 130 Hz, 120 Hz, 110 Hz, 100 Hz, 90 Hz, 80 Hz, 70 Hz, etc.).

In some examples, the bass manager 406 can generate a mono bass channel that includes audio content across some or all of the input channels that falls below a particular frequency threshold. In such examples, the low-frequency portions of all channels are combined into a single mono bass channel that can then be distributed to various devices in proportion to their output capabilities. Alternatively, the low-frequency portions of various channels can be processed and routed separately without being combined into a single mono bass channel.

In some examples, a generated mono bass channel can include content from a LFE channel as well as low-frequency portions of other channels (e.g., left, right, center, left surround, right surround, etc.). This mono bass channel can then be distributed to various playback devices depending on their bass capabilities. For example, the mono bass channel can be routed to some or all of: the audio transducers 408 of the first playback device 404, the subwoofer 410, the left satellite playback device 412, and/or the right satellite playback device 414. In some examples, the mono bass channel can be supplied to these various devices at different levels depending on their bass capabilities. If the right and left satellite playback devices 412, 414 are highly bass capable, for example, a larger proportion of the mono bass channel can be routed to those devices for playback. If a subwoofer 410 is present, then some proportion of the mono bass channel may be routed to the subwoofer 410 for playback, resulting in a relatively smaller proportion of the mono bass channel being played back by the left and right satellite playback devices 412, 414.

The remaining portions of the input channels (e.g., those portions that fall above the frequency threshold associated with the mono bass channel) can then be routed to the various full-frequency playback devices as appropriate. For example, a high-frequency portion of the left surround content can be routed to the left satellite playback device 412, a high-frequency portion of the right surround content can be routed to the right satellite playback device 412, and a high-frequency portion of the left, right, and center content can be routed to the audio transducers 408 of the first playback device.

As a result, some low-frequency content (e.g., content from an LFE channel), which would normally be routed only to a subwoofer or to a multichannel playback device such as a soundbar, may be played back at least in part via discrete surrounds such as the left and right satellite playback devices 412, 414 or other non-subwoofer satellite playback devices. Additionally, low-frequency portions of a given channel (e.g., a low-frequency portion of the left input channel) can be played back via other playback devices that are not playing back a high-frequency portion of that channel. For example, the right satellite playback device 414 can play back at least a portion of the low-frequency portion of the center input channel. In some examples, low-frequency portions of the front left, center and front right channels is routed to the left and right satellite playback devices 412, 414, while the first playback device 404 plays only the high frequency portions of these three channels.

In some examples, the system 400 can automatically assume the first operating mode (illustrated in FIG. 4A) or the second operating mode (illustrated in FIG. 4B) based one or more parameters. In some examples, the system 400 can automatically transition between the first and second operating modes based such parameter(s).

In various examples, the parameters can include characteristics of the various playback devices, such as a device model, number of transducers, an acoustic signature, radiation pattern, device orientation (e.g., vertical or horizontal), device location relative to other devices within the zone, or other characteristics. Such characteristics can be received at the first playback device 404 (e.g., from a control device or the satellite playback devices over a local network, from one or more remote computing devices over a wide area network).

Additionally or alternatively, characteristics of the playback device(s) can be determined via evaluation of the device performance. For example, one or more microphones of the first playback device 404 can be used to determine a bass-output capability, acoustic signature, or other such characteristic of one or more of the other playback devices within the zone. Using this approach, the proportion of low-frequency content played back by various devices within the zone may depend, at least in part, on the particular positioning of the devices within the environment. For example, if the left satellite playback device 412 is well positioned for bass output (e.g., adjacent an acoustically reflective surface such that bass output will be redirected toward a listener in a desirable manner), and the right satellite playback device 414 is relatively poorly positioned for bass output (e.g., not adjacent an acoustically reflective surface), then more of the low-frequency content may be routed to the left satellite playback device 412 than the right satellite playback device 414. Conversely, in some examples, the left satellite playback device 412 being better positioned for bass output than the right satellite playback device 414 may result in the more of the low-frequency content being routed to the right satellite playback device 414 to achieve a balanced bass output. In various examples, microphones of one or more of the devices can be used to assess the bass-output capabilities and performance of the same or other playback devices within the zone. Accordingly, a first amount of low-frequency content may be routed to the first playback device, a second, different amount of the low-frequency content may be routed to the second (e.g., left surround) playback device, a third amount, different from the first and second amounts, of the low frequency content may be routed to the third (e.g., right surround) playback device. In some examples, a fourth amount, different from the first, second, and third amounts, of the low-frequency content can be routed to a fourth (e.g., subwoofer) playback device based on various device capabilities and/or performances. In some examples, an additional fourth (e.g., subwoofer) playback device receives a fifth amount of the low-frequency content that may be the same as or different from the fourth amount based on device performance, placement, orientation, etc.

In some examples, the parameter includes a playback volume level, bass output requirements, a detected transducer excursion level, or other such dynamic variable. For example, while the volume or bass output requirements are below a particular threshold, the system 400 can assume the first operating mode (e.g., each playback device can play back only content associated with a particular channel). As the volume or bass output requirements increase beyond a threshold level, the system 400 can assume the second operating mode (e.g., the low-frequency content across multiple channels can be routed to playback devices in accordance with their bass output capabilities). In this manner, the playback system 400 assumes the second operating mode only when current playback responsibilities involve high bass output levels. As the bass output requirements and/or volume level is reduced, the system 400 can assume the first operating mode. In at least some examples, the playback system 400 operates only in the second operating mode. In some examples, the playback system 400 operates only in the first operating mode.

In some cases, one of the satellite playback devices within the zone may lose power or data connectivity or otherwise be removed from the group. In some cases, continuing to play back audio content via the still-connected playback devices results in a poor psychoacoustic experience for the user. For example, if a left satellite playback device 412 loses power and ceases playback, continuing to play back right-surround audio via the right satellite playback device 414 results in acoustic asymmetry and an undesirable listening experience. As such, it can be useful to cease audio playback of the right satellite playback device 414, even though it is still connected and operable, in response to a determination that the left satellite playback device 412 has ceased playback. However, the acoustic asymmetry noted previously is more prominent in higher frequency audio content, which is more easily localized by a user. Low-frequency audio content, in contrast, is more omnidirectional and more difficult for a user to localize. Accordingly, in instances in which one satellite device ceases playback, the corresponding satellite playback device may cease playback of its high-frequency audio content while continuing to play back the low-frequency portion. For example, if the left satellite playback device 412 ceases playback due to loss of power or connectivity, the right satellite playback device 414 may automatically cease playback of the right-surround audio content while continuing to play back the low-frequency portion of audio content provided by the bass manager 406. In this scenario, for example, the right satellite playback device 414 may play back a first amount of the low-frequency portion of the audio content while the first playback device 404 increases its playback to a second amount of the low frequency portion of the audio content to compensate for the lack of playback via left satellite playback device 412. This approach beneficially takes advantage of the bass-output capability of the remaining connected satellite playback device while avoiding the undesirable effects of only playing back one side (e.g., only a right-surround channel) of the high-frequency audio content.

Figure 5:
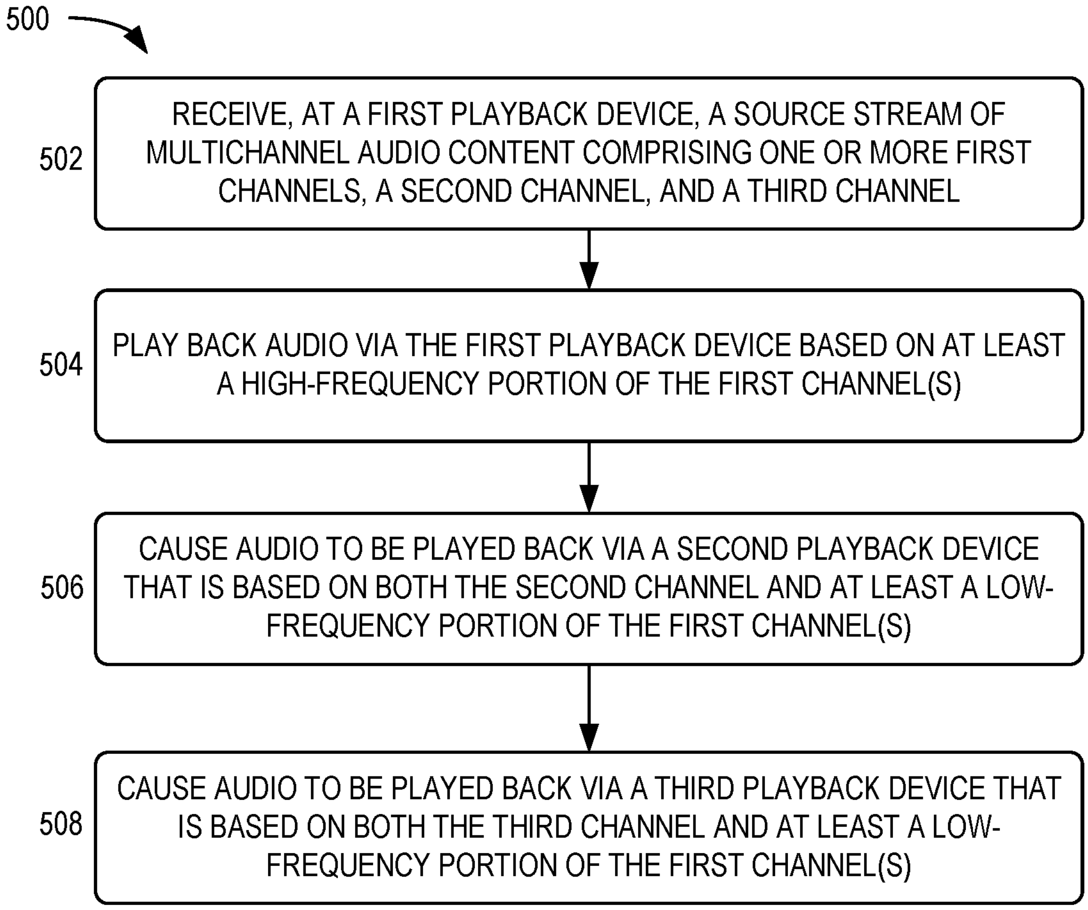
FIG. 5 is a flow diagram of a method for distributing and playing back low-frequency audio content in accordance with examples of the disclosed technology.

FIG. 5 is a block flow diagram of a method 500 for distributing multichannel audio content in accordance with examples of the disclosed technology. The method 500 includes, at block 502, receiving, at a playback device (e.g., the playback device 310 or 404; FIGS. 3A-4B), multichannel audio content from an audio source. The multichannel audio content can include at least one or more first channels (e.g., one or more of left, right, center channels, and LFE channels), a second channel (e.g., a left-surround channel), and a third channel (e.g., a right-surround channel). The audio content can be received from an audio source via a wired or wireless connection.

At block 504, the first playback device plays back audio based on at least a high-frequency portion of the first channel(s). For example, the first channel(s) can include left, right, and center channels. As described previously, the multichannel audio input can be processed to extract a low-frequency portion of content across some or all of the input channels. Accordingly, if the first channel(s) include left, right, and center channels, for example, the transducer(s) of the first playback device can play back at least the high-frequency portions of the left, right, and center channels. However, the low-frequency portions of the left, right, and center channels can be processed and routed separately, and may not necessarily be played back by the first playback device.

The method 500 continues in block 506 with causing audio to be played back via a second playback device (e.g., a left-surround playback device) that is based on both the second channel (e.g., a left-surround channel) and at least a low-frequency portion of the first channel(s) (e.g., one or more of left, right, center, and LFE channels). Similarly, in block 508, the method 500 includes causing audio to be played back via a third playback device (e.g., a right-surround playback device) that is based on both the third channel (e.g., a right-surround channel) and at least a low-frequency portion of the first channel(s) (e.g., one or more of left, right, center, and LFE channels).

As noted previously, the low-frequency content across some or all of the input channels can be distributed among the playback devices within the zone based at least in part on their relative bass output capabilities, and irrespective of the high-frequency content played back by each playback device. For example, while the left-surround playback device can play back the high-frequency portion of the left-surround input channel, the left-surround playback device can also play back at least a portion of the low-frequency content from the center input channel. As such, the bass output capabilities of discrete satellite playback devices (e.g., discrete left and right surround playback devices) can be leveraged to increase the overall bass output capabilities of a playback system.

In some examples, the bass output capability of satellite devices may be particularly low (e.g., in the case of small form factor "ultraportable" devices that are used as satellite playback devices). In such instances, it can be beneficial to route more of the low-frequency content through the other playback device(s), such as a soundbar or other device with higher bass output capacity. In some cases, all or substantially all of the low-frequency content can be routed through such devices, leaving the satellite playback devices to play back only higher frequency content. In some cases, for example, an ultraportable playback device serving as a left surround may only play back a high-frequency portion of the left-surround channel, and the low-frequency content of the left-surround channel can be distributed to other devices (e.g., a soundbar) for playback.

V. Conclusion

The above discussions relating to playback devices, controller devices, playback zone configurations, and media content sources provide only some examples of operating environments within which functions and methods described below may be implemented. Other operating environments and/or configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software examples or components can be embodied exclusively in hardware, exclusively in software, exclusively in firmware, or in any combination of hardware, software, and/or firmware. Accordingly, the examples provided are not the only ways to implement such systems, methods, apparatus, and/or articles of manufacture.

Additionally, references herein to "example" means that a particular feature, structure, or characteristic described in connection with the example can be included in at least one example of an invention. The appearances of this phrase in various places in the specification are not necessarily all referring to the same example, nor are separate or alternative examples mutually exclusive of other examples. As such, the examples described herein, explicitly and implicitly understood by one skilled in the art, can be combined with other examples.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain examples of the present disclosure can be practiced without certain, specific details. In other instances, well known methods, procedures, components, and circuitry have not been described in detail to avoid unnecessarily obscuring examples of the examples. Additionally, features described with reference to one of the figures may be combined with and/or replace features described in other individual figures. Accordingly, the scope of the present disclosure is defined by the appended claims rather than the foregoing description of examples.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The present technology is illustrated, for example, according to various aspects described below. Various examples of aspects of the present technology are described as numbered examples (1, 2, 3, etc.) for convenience. These are provided as examples and do not limit the present technology. It is noted that any of the dependent examples may be combined in any combination, and placed into a respective independent example. The other examples can be presented in a similar manner.

Example 1. A first playback device, comprising: a plurality of transducers; a network interface; one or more processors; and a computer-readable medium storing instructions that, when executed by the one or more processors, cause the first playback device to perform operations comprising: receiving, at the first playback device, a source stream of multichannel audio content comprising one or more first channels, a second channel, and a third channel; playing back audio via the plurality of transducers based on a high-frequency portion of the first channel(s); causing, via the network interface, audio to be played back via a second playback device that is based on both the second channel and at least a low-frequency portion of the first channel(s); and causing, via the network interface, audio to be played back via a third playback device that is based on both the third channel and at least a low-frequency portion of the first channel(s).

Example 2. The first playback device of any one of the preceding Examples, wherein the operations further comprise: determining one or more characteristics of the second playback device and the third playback device with which the first playback device is grouped for synchronous playback; based on the characteristic(s) of the second playback device and the third playback device, automatically operating the first playback device in a first mode or a second mode; while in the first operating mode: playing back audio via the plurality of transducers based on at least the first channel(s); causing, via the network interface, audio to be played back via the second playback device based on the second channel; and causing, via the network interface, audio to be played back via the third playback device based on the third channel; and while in the second operating mode: playing back audio via the plurality of transducers based on the high-frequency portion of the first channel(s); causing, via the network interface, audio to be played back via the second playback device that is based on both the second channel and at least a low-frequency portion of the first channel(s); and causing, via the network interface, audio to be played back via the third playback device that is based on both the third channel and at least a low-frequency portion of the first channel(s).

Example 3. The first playback device of any one of the preceding Examples, wherein the operations further comprise: detecting that the second playback device has lost connection with a synchrony group comprising the first playback device, the second playback device, and the third playback device; after detecting the lost connection, operating the first playback device in a third operating mode; and while in the third operating mode: playing back audio via the plurality of transducers based on the first channel(s); causing, via the network interface, audio to be played back via the third playback device that is based on only low-frequency content of one or more of the first, second, or third channels.

Example 4. The first playback device of any one of the preceding Examples, wherein the operations further comprise: processing the source stream of multichannel audio content to combine a low-frequency portion thereof into a mono bass channel; while in the first operating mode, causing, via the network interface, each of the second and third playback devices to play back audio that includes a first level of the mono bass channel; and while in the second operating mode, causing, via the network interface, each of the second and third playback devices to play back audio that includes a second level of the mono bass channel that is greater than the first level.

Example 5. The first playback device of any one of the preceding Examples, wherein the one or more characteristics of the second and third playback devices comprises parameter indicative of a bass output capacity, wherein parameter indicative of a lower bass output capacity causes the first playback device to operate in the first mode and a parameter indicative of a greater bass output capacity causes the first playback device to operates in the second mode.

Example 6. The first playback device of any one of the preceding Examples, wherein the one or more first channels comprises a low-frequency effects (LFE) channel.

Example 7. The first playback device of any one of the preceding Examples, wherein the second channel and the third channel are each full-frequency channels.

Example 8. The first playback device of any one of the preceding Examples, wherein: the one or more first channels comprise at least a left channel, a right channel, and a center channel; the second channel comprises a left surround channel; and the third channel comprises a right surround channel.

Example 9. The first playback device of any one of the preceding Examples, wherein, the one or more first channels comprises a low-frequency effects (LFE) channel, the operations further comprising: causing, via the network interface, audio to be played back via the second playback device, the third playback device, and a fourth playback device based at least in part on the LFE channel, wherein the fourth playback device comprises a subwoofer.

Example 10. The first playback device of any one of the preceding Examples, wherein, the low-frequency portion of the first channel(s) comprises a portion of the first channel(s) below a frequency threshold, the frequency threshold being a frequency at or below about 120 Hz.

Example 11. A method comprising: receiving, at a first playback device, a source stream of multichannel audio content comprising one or more first channels, a second channel, and a third channel; playing back audio via a plurality of transducers of the first playback device based on a high-frequency portion of the first channel(s); causing, via a network interface, audio to be played back via a second playback device that is based on both the second channel and at least a low-frequency portion of the first channel(s); and causing, via the network interface, audio to be played back via a third playback device that is based on both the third channel and at least a low-frequency portion of the first channel(s).

Example 12. The method of any one of the preceding Examples, further comprising: determining one or more characteristics of the second playback device and the third playback device with which the first playback device is grouped for synchronous playback; based on the characteristic(s) of the second playback device and the third playback device, automatically operating the first playback device in a first mode or a second mode; while in the first operating mode: playing back audio via the plurality of transducers based on at least the first channel(s); causing, via the network interface, audio to be played back via the second playback device based on the second channel; and causing, via the network interface, audio to be played back via the third playback device based on the third channel; and while in the second operating mode: playing back audio via the plurality of transducers based on the high-frequency portion of the first channel(s); causing, via the network interface, audio to be played back via the second playback device that is based on both the second channel and at least a low-frequency portion of the first channel(s); and causing, via the network interface, audio to be played back via the third playback device that is based on both the third channel and at least a low-frequency portion of the first channel(s).

Example 13. The method of any one of the preceding Examples, further comprising: processing the source stream of multichannel audio content to combine a low-frequency portion thereof into a mono bass channel; while in the first operating mode, causing, via the network interface, each of the second and third playback devices to play back audio that includes a first level of the mono bass channel; and while in the second operating mode, causing, via the network interface, each of the second and third playback devices to play back audio that includes a second level of the mono bass channel that is greater than the first level.

Example 14. The method of any one of the preceding Examples, wherein the one or more characteristics of the second and third playback devices comprises parameter indicative of a bass output capacity, wherein parameter indicative of a lower bass output capacity causes the first playback device to operate in the first mode and a parameter indicative of a greater bass output capacity causes the first playback device to operates in the second mode.

Example 15. The method of any one of the preceding Examples, further comprising: detecting that the second playback device has lost connection with a synchrony group comprising the first playback device, the second playback device, and the third playback device; after detecting the lost connection, operating the first playback device in a third operating mode; and while in the third operating mode: playing back audio via the plurality of transducers based on the first channel(s); causing, via the network interface, audio to be played back via the third playback device that is based on only low-frequency content of one or more of the first, second, or third channels.

Example 16. The method of any one of the preceding Examples, wherein the one or more first channels comprises a low-frequency effects (LFE) channel.

Example 17. The method of any one of the preceding Examples, wherein the second channel and the third channel are each full-frequency channels.

Example 18. The method of any one of the preceding Examples, wherein: the one or more first channels comprise at least a left channel, a right channel, and a center channel; the second channel comprises a left surround channel; and the third channel comprises a right surround channel.

Example 19. The method of any one of the preceding Examples, wherein, the one or more first channels comprises a low-frequency effects (LFE) channel, the method further comprising: causing, via the network interface, audio to be played back via the second playback device, the third playback device, and a fourth playback device based at least in part on the LFE channel, wherein the fourth playback device comprises a subwoofer.

Example 20. The method of any one of the preceding Examples, wherein, the low-frequency portion of the first channel(s) comprises a portion of the first channel(s) below a frequency threshold, the frequency threshold being a frequency at or below about 120 Hz.

Example 21. A tangible, non-transitory computer-readable medium storing instructions that, when executed by one or more processors of a first playback device, cause the first playback device to perform operations comprising: receiving, at the first playback device, a source stream of multichannel audio content comprising one or more first channels, a second channel, and a third channel; playing back audio via a plurality of transducers of the first playback device based on a high-frequency portion of the first channel (s); causing, via a network interface, audio to be played back via a second playback device that is based on both the second channel and at least a low-frequency portion of the first channel(s); and causing, via the network interface, audio to be played back via a third playback device that is based on both the third channel and at least a low-frequency portion of the first channel(s).

Example 22. The computer-readable medium of any one of the preceding Examples, wherein the operations further comprise: determining one or more characteristics of the second playback device and the third playback device with which the first playback device is grouped for synchronous playback; based on the characteristic(s) of the second playback device and the third playback device, automatically operating the first playback device in a first mode or a second mode; while in the first operating mode: playing back audio via the plurality of transducers based on at least the first channel(s); causing, via the network interface, audio to be played back via the second playback device based on the second channel; and causing, via the network interface, audio to be played back via the third playback device based on the third channel; and while in the second operating mode: playing back audio via the plurality of transducers based on the high-frequency portion of the first channel(s); causing, via the network interface, audio to be played back via the second playback device that is based on both the second channel and at least a low-frequency portion of the first channel(s); and causing, via the network interface, audio to be played back via the third playback device that is based on both the third channel and at least a low-frequency portion of the first channel(s).

Example 23. The computer-readable medium of any one of the preceding Examples, wherein the operations further comprise: processing the source stream of multichannel audio content to combine a low-frequency portion thereof into a mono bass channel; while in the first operating mode, causing, via the network interface, each of the second and third playback devices to play back audio that includes a first level of the mono bass channel; and while in the second operating mode, causing, via the network interface, each of the second and third playback devices to play back audio that includes a second level of the mono bass channel that is greater than the first level.

Example 24. The computer-readable medium of any one of the preceding Examples, wherein the one or more characteristics of the second and third playback devices comprises parameter indicative of a bass output capacity, wherein parameter indicative of a lower bass output capacity causes the first playback device to operate in the first mode and a parameter indicative of a greater bass output capacity causes the first playback device to operates in the second mode.

Example 25. The computer-readable medium of any one of the preceding Examples, wherein the operations further comprise: detecting that the second playback device has lost connection with a synchrony group comprising the first playback device, the second playback device, and the third playback device; after detecting the lost connection, operating the first playback device in a third operating mode; and while in the third operating mode: playing back audio via the plurality of transducers based on the first channel(s); causing, via the network interface, audio to be played back via the third playback device that is based on only low-frequency content of one or more of the first, second, or third channels.

Example 26. The computer-readable medium of any one of the preceding Examples, wherein the one or more first channels comprises a low-frequency effects (LFE) channel.

Example 27. The computer-readable medium of any one of the preceding Examples, wherein the second channel and the third channel are each full-frequency channels.

Example 28. The computer-readable medium of any one of the preceding Examples, wherein: the one or more first channels comprise at least a left channel, a right channel, and a center channel; the second channel comprises a left surround channel; and the third channel comprises a right surround channel.

Example 29. The computer-readable medium of any one of the preceding Examples, wherein, the one or more first channels comprises a low-frequency effects (LFE) channel, the operations further comprising: causing, via the network interface, audio to be played back via the second playback device, the third playback device, and a fourth playback device based at least in part on the LFE channel, wherein the fourth playback device comprises a subwoofer.

Example 30. The computer-readable medium of any one of the preceding Examples, wherein, the low-frequency portion of the first channel(s) comprises a portion of the first channel(s) below a frequency threshold, the frequency threshold being a frequency at or below about 120 Hz.

The invention claimed is:

1. A first playback device, comprising:

a plurality of transducers;

a network interface;

one or more processors; and a computer-readable medium storing instructions that, when executed by the one or more processors, cause the first playback device to perform operations comprising:

receiving, at the first playback device, a source stream of multichannel audio content comprising one or more first channels, a second channel, and a third channel;

determining one or more characteristics of a second device and a third playback device with which the first playback device is grouped for synchronous playback;

based on the characteristic(s) of the second playback device and the third playback device, automatically operating the first playback device in a first operating mode or a second operating mode;

while in the first operating mode:

playing back audio via the plurality of transducers based on at least the first channel(s);

causing, via the network interface, audio to be played back via the second playback device based on the second channel; and causing, via the network interface, audio to be played back via the third playback device based on the third channel; and while in the second operating mode:

playing back audio via the plurality of transducers based on a high-frequency portion of the first channel(s);

causing, via the network interface, audio to be played back via the second playback device that is based on both the second channel and at least a low-frequency portion of the first channel(s); and causing, via the network interface, audio to be played back via the third playback device that is based on both the third channel and at least a low-frequency portion of the first channel(s).

2. A first playback device, comprising:

a plurality of transducers;

a network interface;

one or more processors; and computer-readable medium storing instructions that, when executed by the one or more processors, cause the first playback device to perform operations comprising:

receiving, at the first playback device, a source stream of multichannel audio content comprising one or more first channels, a second channel, and a third channel, while in a first operating mode, playing back audio via the plurality of transducers based on a high-frequency portion of the first channel(s);

causing, via the network interface, audio to be played back via a second playback device that is based on both the second channel and at least a low frequency portion of the first channel(s);

causing, via the network interface, audio to be played back via a third playback device that is based on both the third channel and at least a low-frequency portion of the first channel(s);

detecting that the second playback device has lost connection with a synchrony group comprising the first playback device, the second playback device, and the third playback device;

after detecting the lost connection, operating the first playback device in a second operating mode; and while in the second operating mode:

playing back audio via the plurality of transducers based on the first channel(s); and causing, via the network interface, audio to be played back via the third playback device that is based on only low-frequency content of one or more of the first, second, or third channels.

3. The first playback device of claim 1, wherein the operations further comprise:

processing the source stream of multichannel audio content to combine a low-frequency portion thereof into a mono bass channel;

while in the first operating mode, causing, via the network interface, each of the second and third playback devices to play back audio that includes a first level of the mono bass channel; and while in the second operating mode, causing, via the network interface, each of the second and third playback devices to play back audio that includes a second level of the mono bass channel that is greater than the first level.

4. The first playback device of claim 1, wherein the one or more characteristics of the second and third playback devices comprises parameter indicative of a bass output capacity, wherein parameter indicative of a lower bass output capacity causes the first playback device to operate in the first operating mode and a parameter indicative of a greater bass output capacity causes the first playback device to operates in the second operating mode.

5. The first playback device of claim 1, wherein the one or more first channels comprises a low-frequency effects (LFE) channel.

6. The first playback device of claim 1, wherein the second channel and the third channel are each full-frequency channels.

7. A method comprising:

receiving, at a first playback device, a source stream of multichannel audio content comprising one or more first channels, a second channel, and a third channel;

determining one or more characteristics of a second device and a third playback device with which the first playback device is grouped for synchronous playback;

based on the characteristic(s) of the second playback device and the third playback device, automatically operating the first playback device in a first operating mode or a second operating mode;

while in the first operating mode:

playing back audio via the plurality of transducers of the first playback devicve based on at least the first channel(s);

causing, via the network interface of the first playback device, audio to be played back via the second playback device based on the second channel; and causing, via the network interface, audio to be played back via the third playback device based on the third channel; and while in the second operating mode:

playing back audio via the plurality of transducers of the first playback device based on a high-frequency portion of the first channel(s);

causing, via the network interface, audio to be played back via the second playback device that is based on both the second channel and at least a low-frequency portion of the first channel(s); and causing, via the network interface, audio to be played back via the third playback device that is based on both the third channel and at least a low-frequency portion of the first channel(s).

8. The method of claim 7, further comprising:

processing the source stream of multichannel audio content to combine a low-frequency portion thereof into a mono bass channel;

while in the first operating mode, causing, via the network interface, each of the second and third playback devices to play back audio that includes a first level of the mono bass channel; and while in the second operating mode, causing, via the network interface, each of the second and third playback devices to play back audio that includes a second level of the mono bass channel that is greater than the first level.

9. The method of claim 7, wherein the one or more characteristics of the second and third playback devices comprises parameter indicative of a bass output capacity, wherein parameter indicative of a lower bass output capacity causes the first playback device to operate in the first operating mode and a parameter indicative of a greater bass output capacity causes the first playback device to operates in the second operating mode.

10. A method comprising:

receiving, at a first playback device, a source stream of multichannel audio content comprising one or more first channels, a second channel, and a third channel;

while in a first operating mode of the first playback device;

playing back audio via a plurality of transducers of the first playback device based on a high-frequency portion of the first channel(s);

causing, via a network interface, audio to be played back via a second playback device that is based on both the second channel and at least a low-frequency portion of the first channel(s); and causing, via the network interface, audio to be played back via a third playback device that is based on both the third channel and at least a low-frequency. portion of the first channel(s);

detecting that the second playback device has lost connection with a synchrony group comprising the first playback device, the second playback device, and the third playback device;

after detecting the lost connection, operating the first playback device in a second operating mode; and while in the second operating mode:

playing back audio via the plurality of transducers based on the first channel(s); and causing, via the network interface, audio to be played back via the third playback device that is based on only low-frequency content of one or more of the first, second, or third channels.

11. The method of claim 7, wherein the one or more first channels comprises a low-frequency effects (LFE) channel.

12. The method of claim 7, wherein the second channel and the third channel are each full-frequency channels.

13. A tangible, non-transitory computer-readable medium storing instructions that, when executed by one or more processors of a first playback device, cause the first playback device to perform operations comprising:

receiving, at the first playback device, a source stream of multichannel audio content comprising one or more first channels, a second channel, and a third channel;

determining one or more characteristics of a second playback device and a third playback device with which the first playback device is grouped for synchronous playback;

based on the characteristic(s) of the second playback device and the third playback device automatically operating the first playback device in a first operating mode or a second operating mode;

while in the first operating mode:

playing back audio via a plurality of transducers of the first playback device based on at least the first channel(s);

causing, via a network interface of the first playback device, audio to be played back via the second playback device based on the second channel; and causing, via the network interface, audio to be played back via the third playback device based on the third channel; and while in the second operating mode:

playing back audio via the plurality of transducers of the first playback device based on a high-frequency portion of the first channel(s);

causing, via a network interface, audio to be played back via the second playback device that is based on both the second channel and at least a low-frequency portion of the first channel(s); and causing, via the network interface, audio to be played back via the third playback device that is based on both the third channel and at least a low-frequency portion of the first channel(s).

14. The computer-readable medium of claim 13, wherein the operations further comprise:

processing the source stream of multichannel audio content to combine a low-frequency portion thereof into a mono bass channel;

while in the first operating mode, causing, via the network interface, each of the second and third playback devices to play back audio that includes a first level of the mono bass channel; and while in the second operating mode, causing, via the network interface, each of the second and third playback devices to play back audio that includes a second level of the mono bass channel that is greater than the first level.

15. The computer-readable medium of claim 13, wherein the one or more characteristics of the second and third playback devices comprises parameter indicative of a bass output capacity, wherein parameter indicative of a lower bass output capacity causes the first playback device to operate in the first operating mode and a parameter indicative of a greater bass output capacity causes the first playback device to operates in the second operating mode.

16. A tangible, non-transitory computer-readable medium storing instructions that, when executed by one or more processors of a first playback device, cause the first playback to perform operations comprising:

receiving at the first playback device, a source stream of multichannel audio content comprising one or more first channels, a second channel, and a third channel;

while in a first operating mode:

playing back audio via a plurality of transducers of the first playback device based on a high-frequency portion of the first channel(s);

causing, via a network interface of the first playback device, audio to be played back via the second playback device that is based on both the second channel and at least a low-frequency portion of the first channel(s); and causing, via the network interface, audio to be played back via the third playback device that is based on both the third channel and at least a low-frequency portion of the first channel(s);

detecting that a second playback device has lost connection with a synchrony group comprising the first playback device, the second playback device, and the third playback device;

after detecting the lost connection, operating the first playback device in a second operating mode; and while in the second operating mode:

playing back audio via the plurality of transducers based on the first channel(s); and causing, via the network interface, audio to be played back via the third playback device that is based on only low-frequency content of one or more of the first, second, or third channels.

17. The computer-readable medium of claim 13, wherein the one or more first channels comprises a low-frequency effects (LFE) channel, and the second channel and the third channel are each full-frequency channels.

* * * * *